United States Patent
Skinner

(10) Patent No.: US 11,229,160 B2
(45) Date of Patent: Jan. 25, 2022

(54) EASY TO LOAD TRIMMER HEAD WITH FORCED DISCHARGE

(71) Applicant: Shakespeare Company, LLC, Boca Raton, FL (US)

(72) Inventor: David Skinner, Columbia, SC (US)

(73) Assignee: SHAKESPEARE COMPANY, LLC, Greer, SC (US)

( * ) Notice: Subject to any disclaimer, the term of this patent is extended or adjusted under 35 U.S.C. 154(b) by 85 days.

(21) Appl. No.: 15/738,655

(22) PCT Filed: Jun. 22, 2016

(86) PCT No.: PCT/US2016/038691
§ 371 (c)(1),
(2) Date: Dec. 21, 2017

(87) PCT Pub. No.: WO2016/209913
PCT Pub. Date: Dec. 29, 2016

(65) Prior Publication Data
US 2018/0177122 A1     Jun. 28, 2018

Related U.S. Application Data

(60) Provisional application No. 62/182,858, filed on Jun. 22, 2015.

(51) Int. Cl.
*A01D 34/416*     (2006.01)
*A01G 3/06*         (2006.01)

(52) U.S. Cl.
CPC ..... *A01D 34/4166* (2013.01); *A01D 34/4163* (2013.01); *A01G 3/06* (2013.01)

(58) Field of Classification Search
CPC .. A01D 34/4163; A01D 34/4166; A01G 3/06; A01G 3/062; A01G 3/067
(Continued)

(56) References Cited

U.S. PATENT DOCUMENTS

| 4,672,798 A | 6/1987 | Ota |
| 8,025,249 B2 | 9/2011 | Alliss et al. |

(Continued)

FOREIGN PATENT DOCUMENTS

| EP | 0 784 919 A1 * | 7/1997 | ......... A01D 34/4163 |
| WO | WO 2013/138752 A1 * | 9/2013 | ......... A01D 34/4163 |
| WO | WO 2014/014316 | * 3/2014 | ......... A01D 34/4163 |

OTHER PUBLICATIONS

International Search Report and Written Opinion for International Application No. PCT/US2016/038691 dated Sep. 13, 2016 (7 pages).

(Continued)

*Primary Examiner* — Clark F Dexter
(74) *Attorney, Agent, or Firm* — Eversheds Sutherland (US) LLP

(57) ABSTRACT

A trimmer head for a trimmer having a shaft defining a rotation axis is provided. The trimmer head includes a housing including a main housing and a lower cover, wherein the main housing contains a pair of opposed eyelets through which trimmer line is discharged. A spool is encased within the housing, with a bump knob connected thereto, and has a passageway with opposed ends and extending from one side of the spool to another, the opposed ends being alignable with the eyelets to receive the line. A first set of ramps is located on an inside surface of the main housing and a second set of ramps is located within a center barrel of the spool. The two sets of ramps interact to control the direction of releasing line from the trimmer head and forcing indexing of the spool when the bump knob is bumped.

13 Claims, 34 Drawing Sheets

(58) Field of Classification Search
USPC .......................... 30/276, 347; 56/12.7, 12.5
See application file for complete search history.

(56) References Cited

U.S. PATENT DOCUMENTS

| | | | |
|---|---|---|---|
| 8,266,805 B1 | 9/2012 | Alliss | |
| 8,910,387 B2 | 12/2014 | Alliss | |
| 9,861,033 B2 * | 1/2018 | Skinner et al. | A01D 34/4163 |
| 10,130,029 B2 * | 11/2018 | Pellenc et al. | A01D 34/4161 |
| 10,130,030 B2 * | 11/2018 | Sprungman et al. | A01D 34/4163 |
| 10,273,112 B2 * | 4/2019 | Alliss | A01D 34/4165 |
| 2004/0134078 A1 * | 7/2004 | Pfaltzgraff | A01D 34/4163 30/276 |
| 2008/0053052 A1 * | 3/2008 | Cigarini | A01D 34/4163 56/12.7 |
| 2009/0100686 A1 * | 4/2009 | Sing et al. | A01D 34/4166 30/303 |
| 2011/0000091 A1 * | 1/2011 | Proulx | A01D 34/4165 30/276 |
| 2011/0119932 A1 * | 5/2011 | Pfaltzgraff et al. | A01D 34/4165 30/347 |
| 2011/0214301 A1 * | 9/2011 | Proulx | A01D 34/416 30/347 |
| 2011/0239468 A1 * | 10/2011 | Conlon | A01D 34/4163 30/276 |
| 2013/0133208 A1 | 5/2013 | Skinner | |
| 2015/0150191 A1 | 6/2015 | Alliss | |
| 2015/0264861 A1 * | 9/2015 | Kullberg | A01D 34/4165 30/276 |
| 2016/0106034 A1 * | 4/2016 | Arnetoli | A01D 34/4166 30/276 |
| 2016/0128276 A1 | 5/2016 | Arnetoli | |
| 2016/0183452 A1 * | 6/2016 | Kullberg | A01D 34/4161 30/276 |
| 2016/0249529 A1 * | 9/2016 | Ma et al. | A01D 34/4163 30/276 |
| 2017/0347523 A1 * | 12/2017 | Alliss | A01D 34/4161 |
| 2018/0020615 A1 * | 1/2018 | Alliss | A01D 34/4163 30/276 |

OTHER PUBLICATIONS

Third Party Observation filed for International Application No. PCT/US2016/038691 filed Sep. 14, 2017 (2 pages).
Third Party Observation filed for International Application No. PCT/US2016/038691 filed Feb. 16, 2017 (2 pages).
Third Party Observation filed for International Application No. PCT/US2016/038691 filed Sep. 21, 2017 (1 page).

* cited by examiner

EASY TO LOAD TRIMMER HEAD WITH FORCED DISCHARGE

CROSS REFERENCE TO RELATED APPLICATIONS

This application is a U.S. national stage application of International Application No. PCT/US2016/038691, filed Jun. 22, 2016, which claims the benefit of U.S. Provisional Patent Application No. 62/182,858 filed on Jun. 22, 2015, the disclosures of which are incorporated herein by reference.

FIELD OF THE INVENTION

This invention relates generally to line-type vegetation trimmer heads for rotary trimmers and, more specifically, to bump-activated trimmer heads for rotary trimmers using monofilament trimmer line as a means for cutting vegetation. More particularly, it relates to easy-load trimmer heads with a bump-activated indexing of trimmer line that operate with minimal vibration.

BACKGROUND OF THE INVENTION

There are a number of different classes of rotary trimmer heads, defined generally by the manner in which the trimmer line is fed, spooled or replaced in the trimmer head and/or by how the trimmer line is discharged, indexed or lengthened during use of the trimmer head.

One such class of trimmer heads is the "bump-feed" or "bump-activated" class of trimmer heads. Historically, bump-activated trimmer heads have been designed with a bump knob or similar ground contacting member that is mechanically linked to the internal spool in the rotary trimmer head such that both parts (i.e., the bump knob and the internal spool) have the same rotational speed. When this bump knob contacts the ground for the purpose of releasing more line, the contact with the ground slows the rotational speed of the knob and the spool in concert. The bumping action also creates a vertical upward force, lifting the spool upward in the housing. For this brief moment, the spool is no longer locked to the housing, and the spool can rotate independent of the housing. The difference in the rotation speeds between the spool and the housing causes the line to be released from the head if the line is wound on the spool in a first preferred direction. If the line had been wound onto the spool in a second direction, then the line may release from the head or it may wind further onto the spool, possibly pulling completely into the trimmer head housing. The winding or unwinding action that occurs in this latter situation depends both on the specifics of the bump knob design as well as on the cutting conditions.

Easy-load type bump-feed trimmer heads generally have two features not found in other types of bump-feed trimmer heads. Specifically, easy-load type trimmer heads have a set of ramps and a channel through which trimmer line may pass through. The channel creates a passage way connecting opposite sides of the trimmer head. With these two features, the trimmer line can be loaded into the head and the line wound on the internal spool without having to disassemble the trimmer head. These features are unique to easy-load type trimmers and are advancements over older head designs which required the user to disassemble the head to manually wrap the line on the spool.

With respect to the ramps, they are placed between the housing and the spool. The user must be able to rotate the internal spool for the concept to work. With these designs, the user loads the trimmer line into the trimmer head by passing the trimmer line through the line channel until equal lengths extend from both eyelets. Then, by rotating the bump knob which is connected to the spool, the line is wound on the spool. The vertical walls of the ramps prevent rotation in one direction while the slanted walls of the ramps allow for movement in the other direction. It will be appreciated that the trimmer line should be wound on the spool in the opposite direction that the trimmer head rotates. The ramps function well in that the user can rotate the spool in one direction for loading line, but, during its operation, the vertical wall locks the rotation of the spool to the housing until bumped. This configuration allows for loading of replacement trimmer line without disassembly of the head.

With respect to the line channel, there are patents directed toward line channels that go straight through the center of the spool. However, because the line channel goes through the middle of the head, this concept limits the type of trimmers to which the trimmer head can attach. Basically, it is only commercially viable for a string trimmer with short mounting stems.

One or more other patents, such as U.S. Pat. No. 8,025,249, teach loading line through a trimmer head with a line channel that goes straight through a flange to the center bore of the internal spool. The line then travels around the perimeter of this central opening (bore), and then continues again straight to the far side. These patents are more beneficial for trimmer heads that attach to trimmer models with long attachment stems.

A significant issue in the design of Easy-Load Bump-Activated trimmer heads is that they are assembled from multiple molded parts. Designing the assembly to operate without vibration is challenging. Vibration is less noticeable with gas trimmers because a significant contribution to the vibration is from the gasoline powered motor, located at the upper end of the machine. And, there is also vibration contributed from the high speed rotation of the drive shaft, which connects the rotational power from the motor to the trimmer head.

For electric trimmers, the electric motor is often positioned at the lower end of the machine adjacent to the trimmer head, which eliminates the need for a drive shaft. This means lower cost and less vibration. The result of improvements to lithium battery technology is that battery-powered electric trimmers are displacing market share traditionally held by gas trimmers. As original equipment manufacturers (OEMs) of string trimmers try to adapt existing designs of trimmer heads to new electric trimmer designs, the contribution of vibration from trimmer heads is becoming more noticeable.

Thus, there is a need in the weed trimmer industry for new easy-load trimmer head designs that operate at very low levels of vibration, or free of vibration. And, preferably, the designs should allow for easy loading of trimmer line and bump-activated release of line as needed.

Some of the challenges of designing complex trimmer heads assembled from multiple molded parts are in designing the head to be free of vibration and to design the housing with minimal openings. This later challenge is needed to prevent dirt and debris from enter the trimmer head, because dirt and debris will interfere with the performance and vibration properties of the trimmer head. Preferably, new designs would not allow any dirt or debris to enter the assembled trimmer head. Thus, there is a need for new designs of easy-load bump-activated trimmer heads that are nearly sealed to prevent dirt and debris from entering the trimmer head.

The structure of the bump knob of most trimmer heads of the prior art consist of a cylindrical-shaped bump knob that extends through the lower cover of the trimmer head housing. The problem with these cylindrical shaped bump knobs is that they present a small surface area to the ground, and thus they tend to wear out quickly when used by commercial landscapers. Additionally, the diameter of the cylindrical shape is typically less than 2 inches, and thus difficult to grip and turn; actions that are needed to turn the spool and thus wind trimmer line onto the easy-load bump heads. Therefore, there is a need for bump knobs that are larger in diameter and thus cover the full lower face of a trimmer head.

Another shortcoming of the prior art is that in some instances, the line will not release from the head. This is more apt to happen when the trimmer line becomes short and very little trimmer line is extending from the trimmer head. In the prior art, the predominate means of extending line from the trimmer head is centrifugal force acting on the portion of line extending from the head combined with wind drag, both which occur when the trimmer head is spun. These forces are more effective when longer lengths (3 inches or more) of trimmer line are extending from the head. However, these forces are less effective in pulling and extending the line from the head when less than 2 inches of line are extending from the head. Thus, there is a need for a means to release line from the head when the line has become too short to be pulled from the head by conventional means (centrifugal force and wind drag).

To overcome these deficiencies, new improved designs of easy-load bump heads are needed which are capable of functioning with minimal vibration, a means to release trimmer line regardless of the length extending from the head, be provided with a full-faced bump knob that can easily be gripped by the user, and that function without the user configuring the head.

SUMMARY OF THE INVENTION

In a first embodiment, the present invention provides a bump-activated trimmer head for a rotary trimmer of the type that utilizes wound trimmer line to cut vegetation. The rotary trimmer has a shaft defining a rotation axis and the trimmer head comprises a housing attached to the rotary shaft of the rotary trimmer. The housing includes a main housing and a lower cover, wherein a sidewall of the main housing contains at least a pair of opposed eyelets through which the trimmer line is discharged for cutting the vegetation. A spool is encased within the housing and the spool has a passageway for the trimmer line, the passageway having opposed ends and extending from one side of the spool to an opposite side and the opposed ends of the passageway are alignable with the opposed eyelets of the housing. A bump knob mechanism operatively connects to the spool. Two sets of a plurality of ramp projections, wherein the first set of the plurality of ramp projections is located on an inside surface of an upper wall of the main housing and the second set of ramp projections is located within a center barrel of the spool. The two sets of ramp projections function together to control the direction of releasing line from the trimmer head and forcing the indexing of the spool when the bump knob mechanism is bumped against the ground.

In a second embodiment, the present invention provides a trimmer head as in the first embodiment, wherein a shaft extension is insert molded into the main housing and the shaft extension interacts with the bump knob to control the axis of rotation of the bump knob.

In a third embodiment, the present invention provides a trimmer head as in either the first or second embodiments, wherein at least one ramp projection of each set of the plurality of ramp projections includes a flat segment, a vertical segment, and a sloped segment.

In a fourth embodiment, the present invention provides a trimmer head as in any of the first through third embodiments, wherein at least one ramp projection of each set of the plurality of ramp projections includes a flat segment, a vertical segment, a first sloped segment, and a second sloped segment.

In a fifth embodiment, the present invention provides a trimmer head as in any of the first through fourth embodiments, wherein at least one ramp projection of each set of the plurality of ramp projections includes a flat segment, a first vertical segment, a second vertical segment, and a sloped segment.

In a sixth embodiment, the present invention provides a trimmer head as in any of the first through fifth embodiments, wherein at least one ramp projection of each set of the plurality of ramp projections includes a first vertical segment, a second vertical segment, a first sloped segment, and a second sloped segment.

In a seventh embodiment, the present invention provides a trimmer head as in any of the first through sixth embodiments, wherein the bump knob mechanism is as wide as the trimmer head itself.

In an eighth embodiment, the present invention provides a trimmer head as in any of the first through seventh embodiments, wherein the bump knob mechanism comprises both an indexing knob and a bump knob and wherein the bump knob is not as wide as the trimmer head itself.

In a ninth embodiment, the present invention provides a trimmer head as in any of the first through eighth embodiments, further comprising a line channel cover designed to be inserted into the center barrel of the spool. The line channel cover contains an internal line channel passageway that aligns with the passageway of the spool to allow for easy threading of the trimmer line.

In a tenth embodiment, the present invention provides a trimmer head as in any of the first through ninth embodiments, wherein the second set of ramp projections are part of the spool.

In a eleventh embodiment, the present invention provides a trimmer head as in any of the first through tenth embodiments, wherein the second set of ramp projections are located on the channel cover inserted within the center barrel of the spool.

In a twelfth embodiment, the present invention provides a trimmer head as in any of the first through eleventh embodiments, further comprising a third set of ramp projections located on a bottom surface of the spool and vertical walls and curvilinear slots located on a top surface of the lower cover. The third set of ramp projections along with the vertical walls and curvilinear slots function together to control the direction of line released from the trimmer head as well as forcing the indexing of the spool when the bump knob mechanism is bumped against the ground.

In a thirteenth embodiment, the present invention provides a trimmer head as in any of the first through twelfth embodiments, wherein at least one ramp projection of the third set of ramp projections includes a first flat segment, a vertical segment, and a sloped segment that combine to form a ramp shape of the ramp projections.

In a fourteenth embodiment, the present invention provides a trimmer head as in any of the first through thirteenth embodiments, wherein the main housing further comprises two openings on opposite sides of the sidewall and the lower cover further comprises two tabs. The main housing and the lower cover are connected by the tabs extending upwardly into the interior of the main housing and being received by the openings.

In a fifteenth embodiment, the present invention provides a trimmer head as in any of the first through fourteenth embodiments, wherein the spool further comprises at least three flanges essentially parallel to each other. The opposed ends of the passageway are located between the same two flanges, and wherein the same two flanges are operationally connected by at least one inclining portion on one of the two flanges and at least one opening on the other of the two flanges. This connection thereby allowing passage of the trimmer line up the at least one inclining portion, through the at least one opening, and into a space defined by the flange having the at least one opening and the third flange.

In a sixteenth embodiment, the present invention provides a trimmer head as in any of the first through fifteenth embodiments, wherein the opposed ends of the passageway are located between a first flange and a middle flange, and wherein the first flange includes two inclining portions positioned about 180 degrees opposite each other relative to the circumference of the first flange. The middle flange includes two openings in alignment and essentially contiguous with the two inclining portions of the first flange, such that the trimmer line, extending from each of the opposed eyelets of the housing, is wound between the first and middle flange, up the inclining portions of the first flange, through the openings of the middle flange, and into a space between the middle flange and the third flange.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENT

One representative embodiment of a trimmer head according to the concepts of the present invention is designated generally by the numeral 10 in FIGS. 1 to 4 herein. Details of this embodiment are depicted in FIGS. 1 through 19.

The trimmer head 10 is comprised of ten assembled pieces plus four screws. These components are combined into two main assemblies.

Figure 6A:
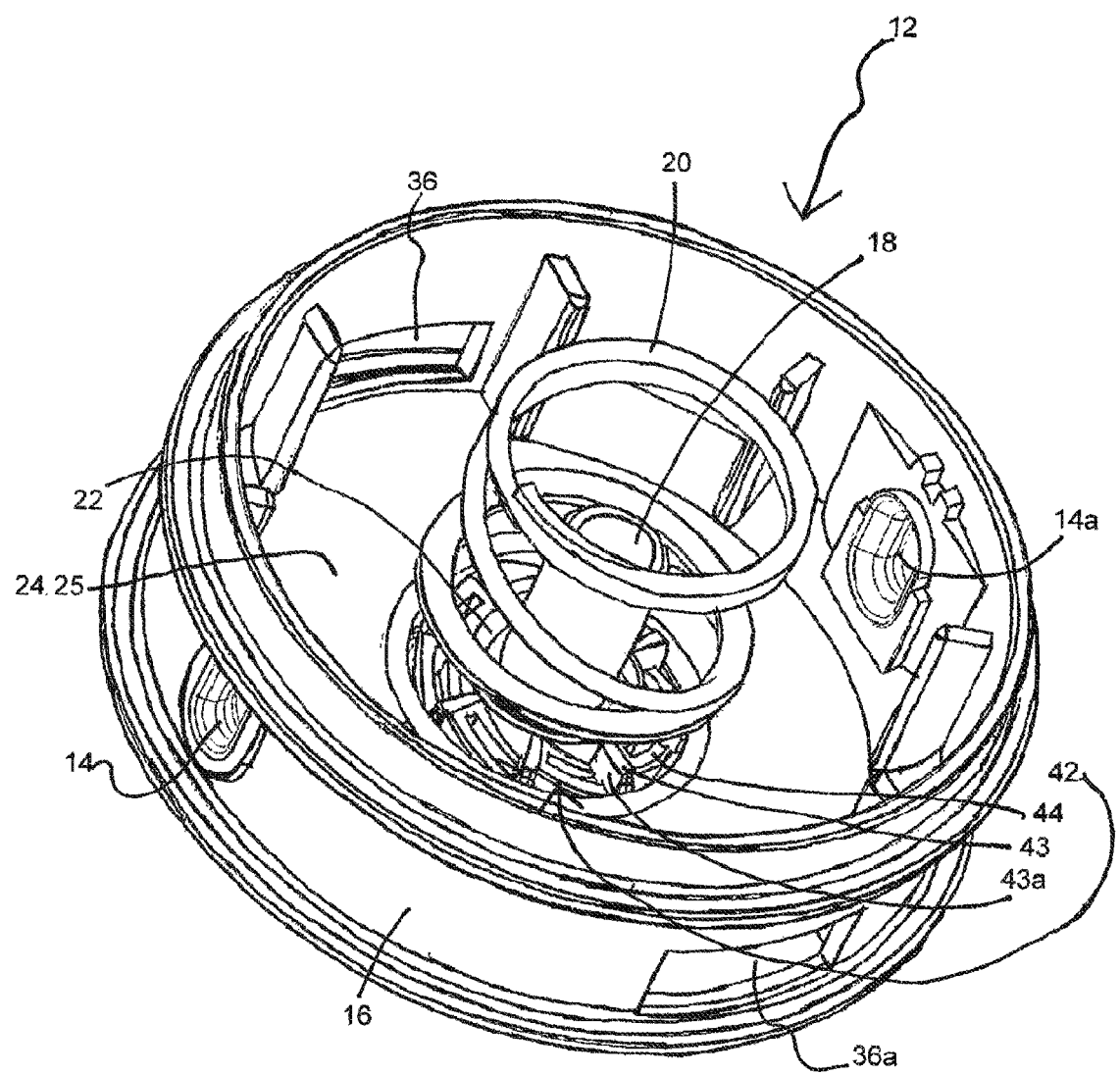
FIG. 6A is a lower perspective view of the main housing with the compression spring and eyelets installed, for the trimmer head in FIG. 1.
Figure 18:
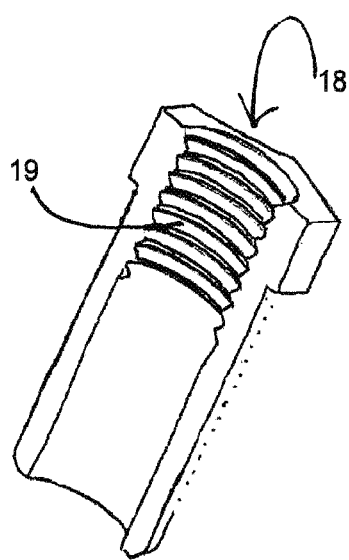
FIG. 18 is a cross-sectional view of the shaft extension.

The first of these two assemblies is depicted in FIG. 6A. The assembly in FIG. 6A consists of a main housing 12, two eyelets 14, 14a pressed into openings on opposite sides of the sidewall 16 of the main housing 12, a metal shaft extension 18 and a biasing spring 20 which snaps around a post 22 located at the center of the housing 12. In this embodiment, there are ramp projections 42 located immediately adjacent the post 22 and the biasing spring 20 snaps around the periphery of the ramp projections 42. The two eyelets 14, 14a are diametrically opposed and are shown to be oval or oblong in shape, but may take any shape useful in the art, including, for example, round in shape. If more than two eyelets are provided, it will be understood that the various eyelets will be symmetrically disposed. The main housing 12 is injection molded with glass-filled nylon, however, other plastics could be used. The metal shaft extension 18 is insert-molded into the upper wall 24 of the main housing 12 and extends above the inside surface 25 of the upper wall 24 of the trimmer head 10. The shaft extension 18 is hollow and has internal threads 19 which are depicted in FIG. 18. The shaft extension 18 in FIG. 18 is designed for attachment to a trimmer machine which has a male threaded stem on the end of the machine (not shown).

In an alternate embodiment, the shaft extension 18 could be solid or hollow. In the alternate embodiment, the shaft extension 18 would extend above the inside surface 5 of the upper wall 24 of the main housing 12 just as depicted in FIG. 6A. However, the shaft extension 18 would also extend above the outside surface 26 of the main housing 12; and, it would contain external threads for attachment to an internally threaded trimmer machine stem.

Figure 1:
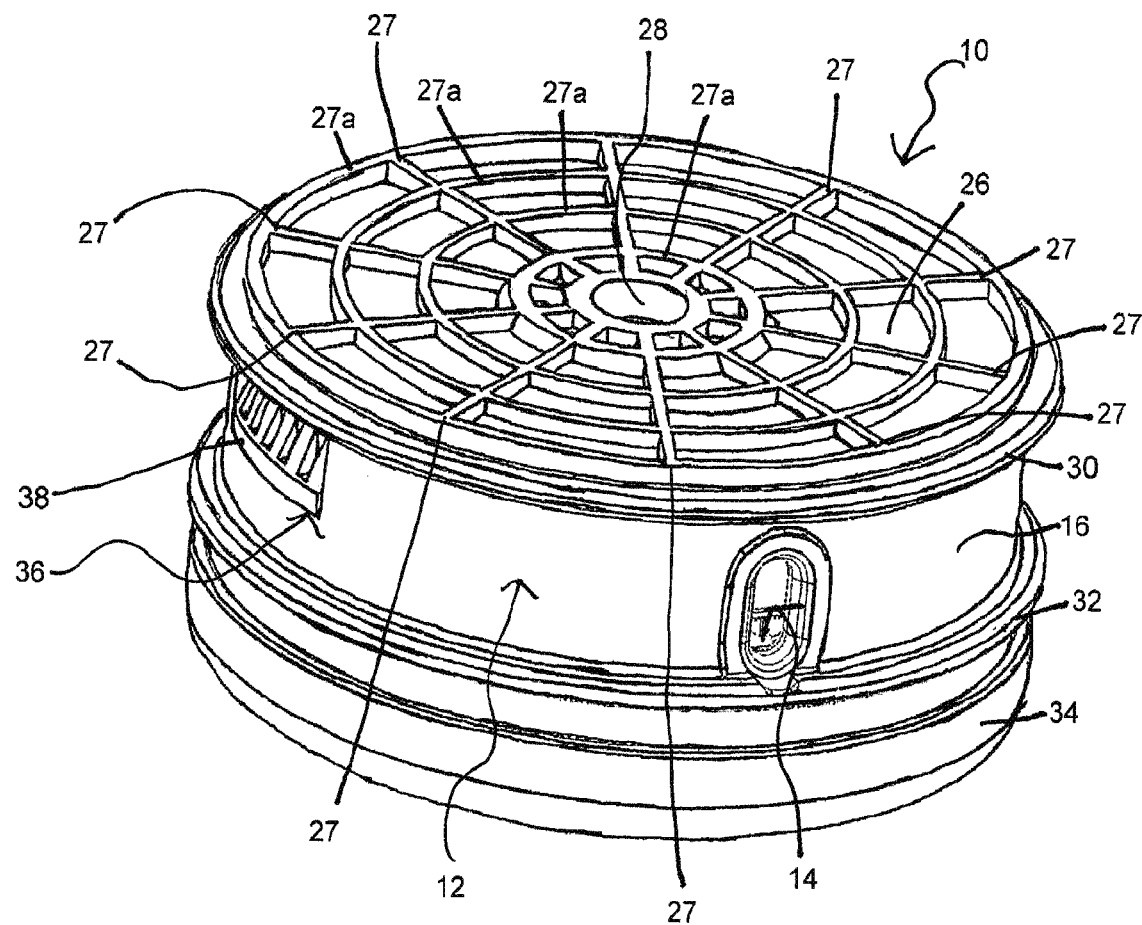
FIG. 1 is an upper perspective view of a first embodiment of a trimmer head according to the concepts of the present invention.

The outside surface 26 of the upper wall 24 of the main housing 12 is depicted in FIG. 1 with ribs 27 and 27a. These ribs 27 and 27a are necessary to strengthen the upper wall 24 of the main housing 12 to prevent deformation during use. However, these ribs 27 and 27a could alternatively be located on the inside surface 25 of the upper wall 24 of the main housing 12. Another alternative would involve ribs located on both sides of upper wall 24. Also notable is that there are no openings in the upper wall 24 of the main housing 12 other than a central opening 28, which will be blocked once the trimmer head 10 is attached to the string trimmer machine.

Figure 2:
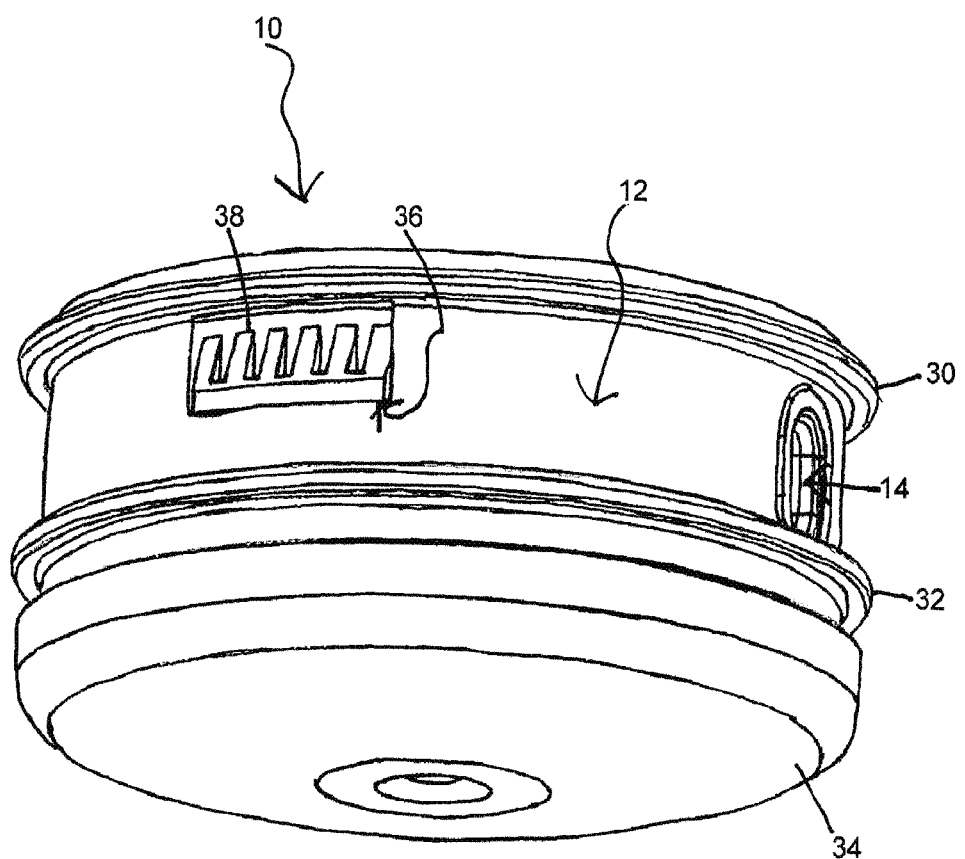
FIG. 2 is a lower perspective view of the trimmer head in FIG. 1.
Figure 4:
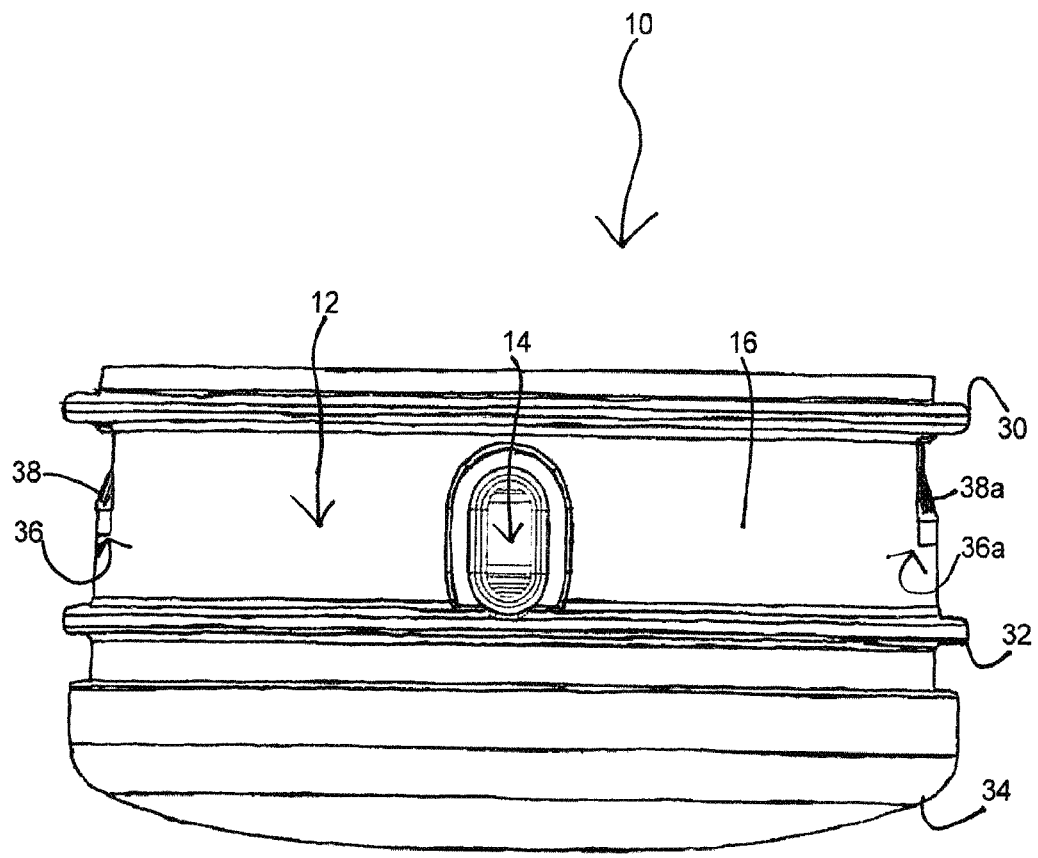
FIG. 4 is a side view of the trimmer head in FIG. 1.
Figure 5:
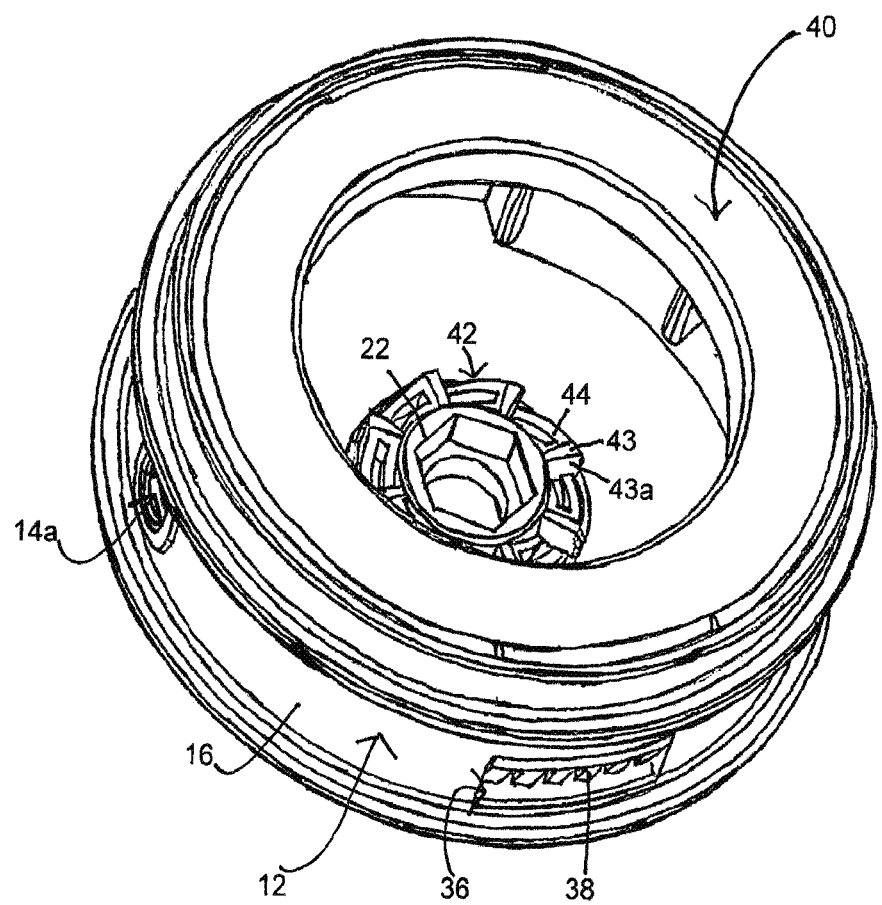
FIG. 5 is a lower perspective view of the main housing and lower housing cover assembled, for the trimmer head in FIG. 1.

The main housing 12 also has five other notable features, two of which function to minimize breakage of trimmer line during operation of the trimmer head 10. The first feature is a pair of circumferential ribs 30 and 32 which are depicted in FIGS. 2 & 4. The ribs protect the trimmer line (not shown) from impacting with objects as it immediately exits from the eyelets 14, 14a. Thus the circumferential ribs 30 and 32 are located close to the eyelets 14, 14a. Additionally, the lower rib 32 provides an overhang to minimize dirt and debris from entering the trimmer head 10 between a bump knob mechanism, comprising a bump knob 34, and the main housing 12.

The second feature on the main housing 12 is the two openings 36, 36a on opposite sides of the sidewall 16 of the trimmer head 10. These openings 36, 36a are designed to receive tabs 38, 38a from a lower housing cover 40. The openings 36, 36a are blocked once the tabs 38, 38a are received, thus preventing debris from entering the trimmer head 10.

Referring to FIG. 1, the third feature is the central opening 28 centrally located concentric within an axis of rotation. To attach the first assembly as shown in FIG. 6A to a trimmer machine, a male threaded stem from the trimmer machine would be inserted in the central opening 28 and the trimmer head 10 rotated in to screw the internal threads 19 on the shaft extension 18 to the threaded stem on the trimmer machine stem (not shown).

Figure 6B:
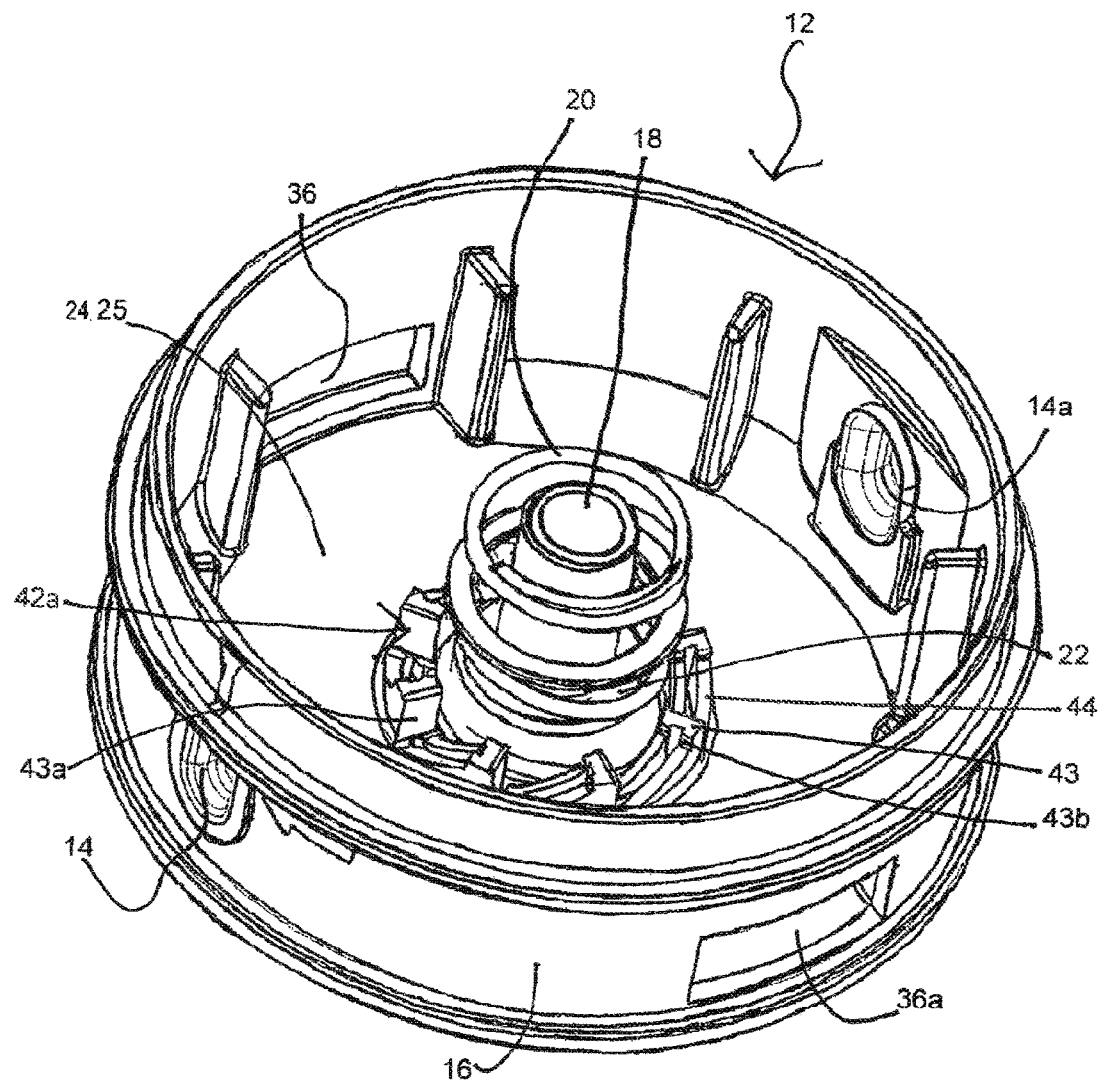
FIG. 6B is an alternative embodiment of the lower perspective view of the main housing with the compression spring and eyelets installed, for the trimmer head in FIG. 1.
Figure 7A:
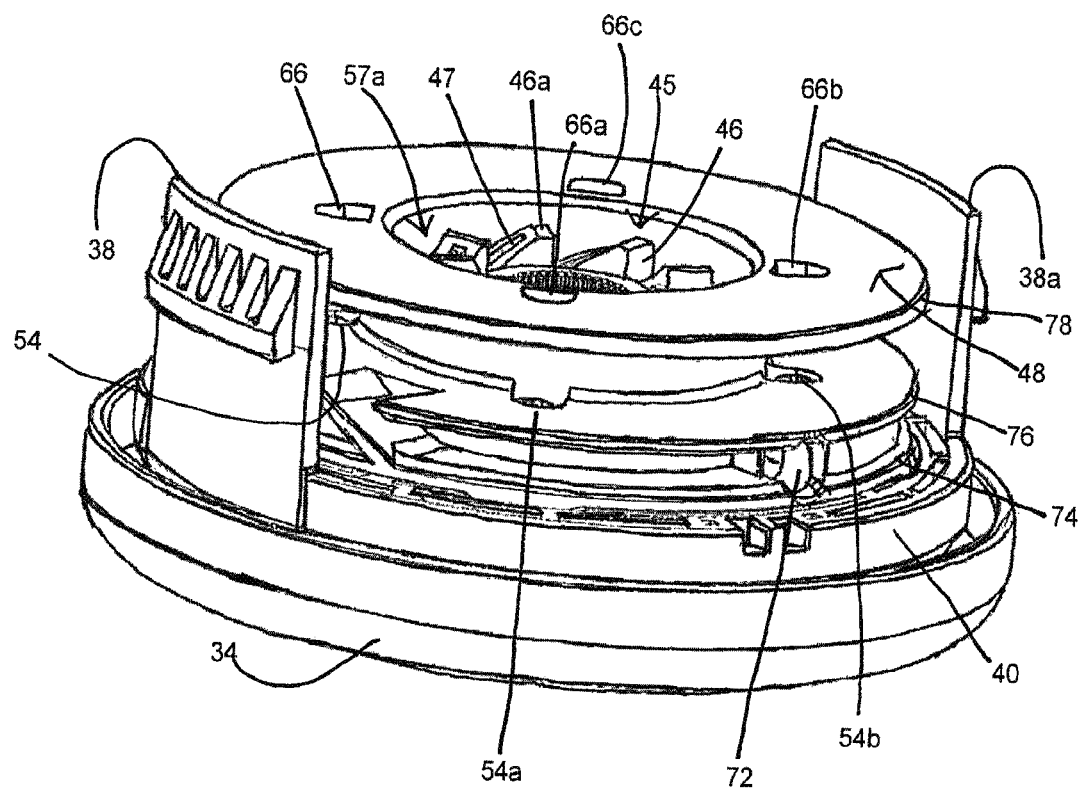
FIG. 7A is an upper perspective view of the assembly of lower housing cover sandwiched between the spool and bump knob for the trimmer head in FIG. 1.
Figure 7B:
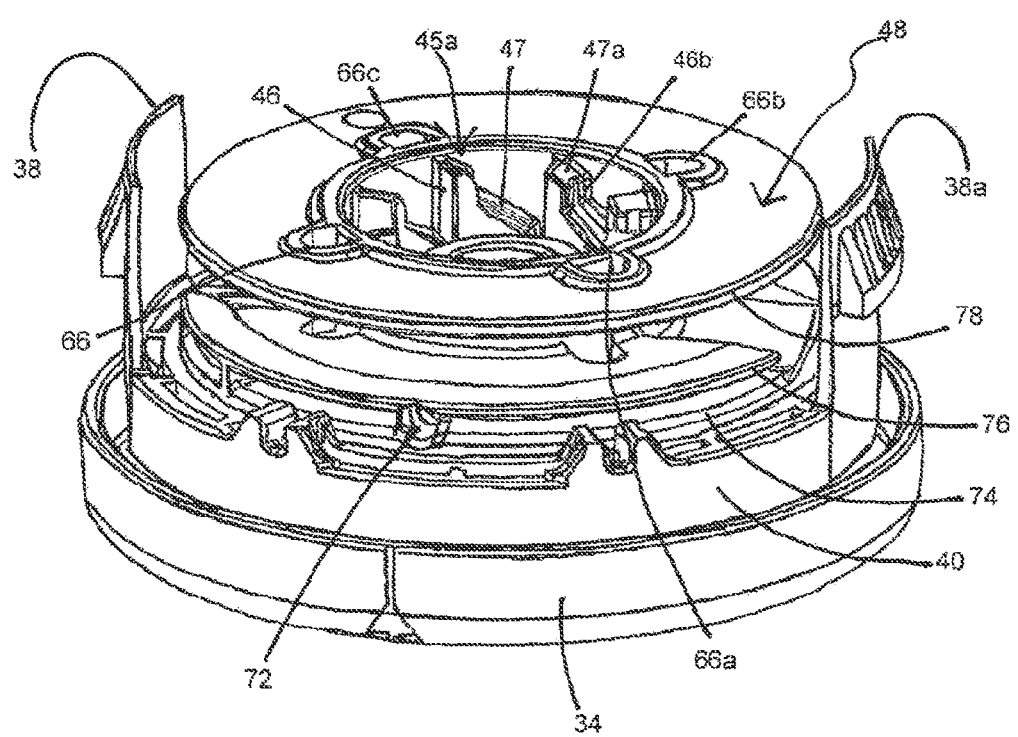
FIG. 7B is an alternative embodiment of the upper perspective view of the assembly of lower housing cover sandwiched between the spool and bump knob for the trimmer head in FIG. 1.

Referring to FIGS. 6A & 7A, there are a plurality of ramp projections 42 located on and around the post 22 and a plurality of ramp projections 45 located on a spool 48. Preferably, the number of ramp projections 42 will match the number of ramp projections 45, and both sets of ramp projections would be sized similarly. If the number of ramp projections were different, then the divisor of the larger number of ramp projections divided by the smaller number of ramp projections would equal a whole number. In an alternative embodiment, there is no post 22 and the plurality of ramp projections 42 extend directly from the upper wall 24 of the main housing 12. The ramp projections shown in FIGS. 6A and 7A are of one type and are included in a direction appropriate for a head configured for a trimmer machine that rotates the trimmer head counterclockwise (CCW), when viewed from above. The ramp projections 42a, 45a shown in FIGS. 6B and 7B are of two types that can function together, and are included in a direction appropriate for a head configured for a trimmer machine that rotates the trimmer head in a clockwise (CW) direction. The types of ramp projections can be configured for either head rotation direction so long as the direction of incline matches the rotational direction referenced in the above examples.

The ramp projections 42 are symmetrically disposed at the same height around the post 22. Each ramp projection 42 includes a flat segment 43, a vertical segment 43a, and a sloped segment 44. In an alternative embodiment not shown, the ramp projections contain a flat segment, a vertical segment, a first sloped segment, and a second sloped segment. In another alternative embodiment as shown in FIG. 6B, the ramp projections 42a contain a flat segment 43, a first vertical segment 43a, a second vertical segment 43b, and a sloped segment 44. The flat segment 43, the vertical segment 43a, and the sloped segment 44; or the flat segment, vertical segment, the first sloped segment, and the second sloped segment; or the flat segment 43, the first vertical segment 43a, the second vertical segment 43b, and the sloped segment 44; combine to form the wedge/ramp shape of the ramp projection 42 or 42a, respectively.

Similarly, the ramp projections 45 are symmetrically disposed at the same height around the spool 48, and each ramp projection 45 includes a vertical segment 46, a flat segment 46a, and a sloped segment 47 which combine to form the wedge/ramp shape of the ramp projection 45. In an alternative embodiment, as shown in FIG. 7B, the ramp projections 45a would contain a first vertical segment 46, a second vertical segment 46b, a first sloped segment 47, and a second sloped segment 47a. In another alternative embodiment, not shown, the ramp projections would contain a first vertical segment, a second vertical segment, a flat segment, and a sloped segment. These two sets of ramp projections, such as ramp projections 42 and 45, function to force the indexing of the spool 48 when the bump knob 34 is bumped against the ground. These ramp projections 42 and 45 precisely control the indexing of additional line from the spool 48 and out of the trimmer head 10. The flat segments of the ramp projections prevent over indexing wherein the sloped segments of the ramp projections force the spool 48 to rotate in just one direction to release a controlled amount of line when the bump knob 34 is bumped against the ground.

Figure 12:
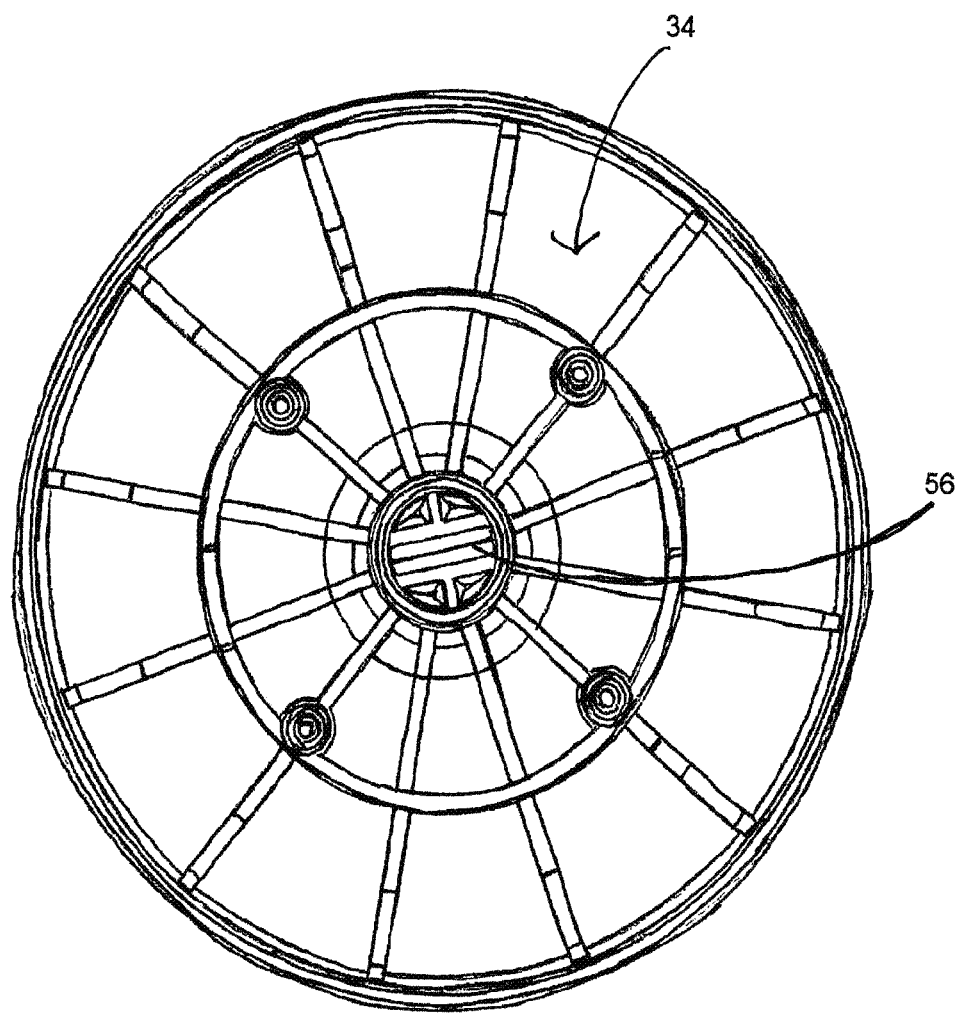
FIG. 12 is an upper view of the bump knob.
Figure 13:
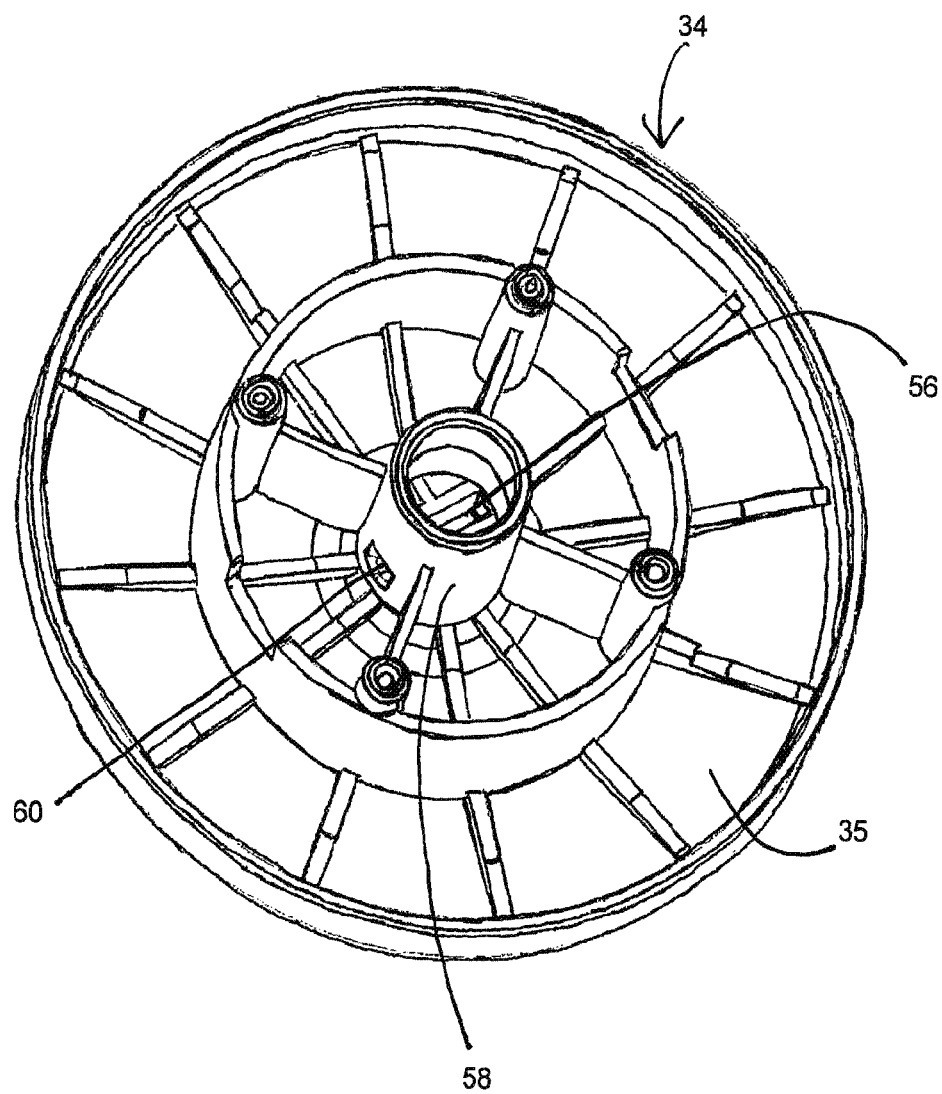
FIG. 13 is a perspective view of the bump knob.
Figure 14:
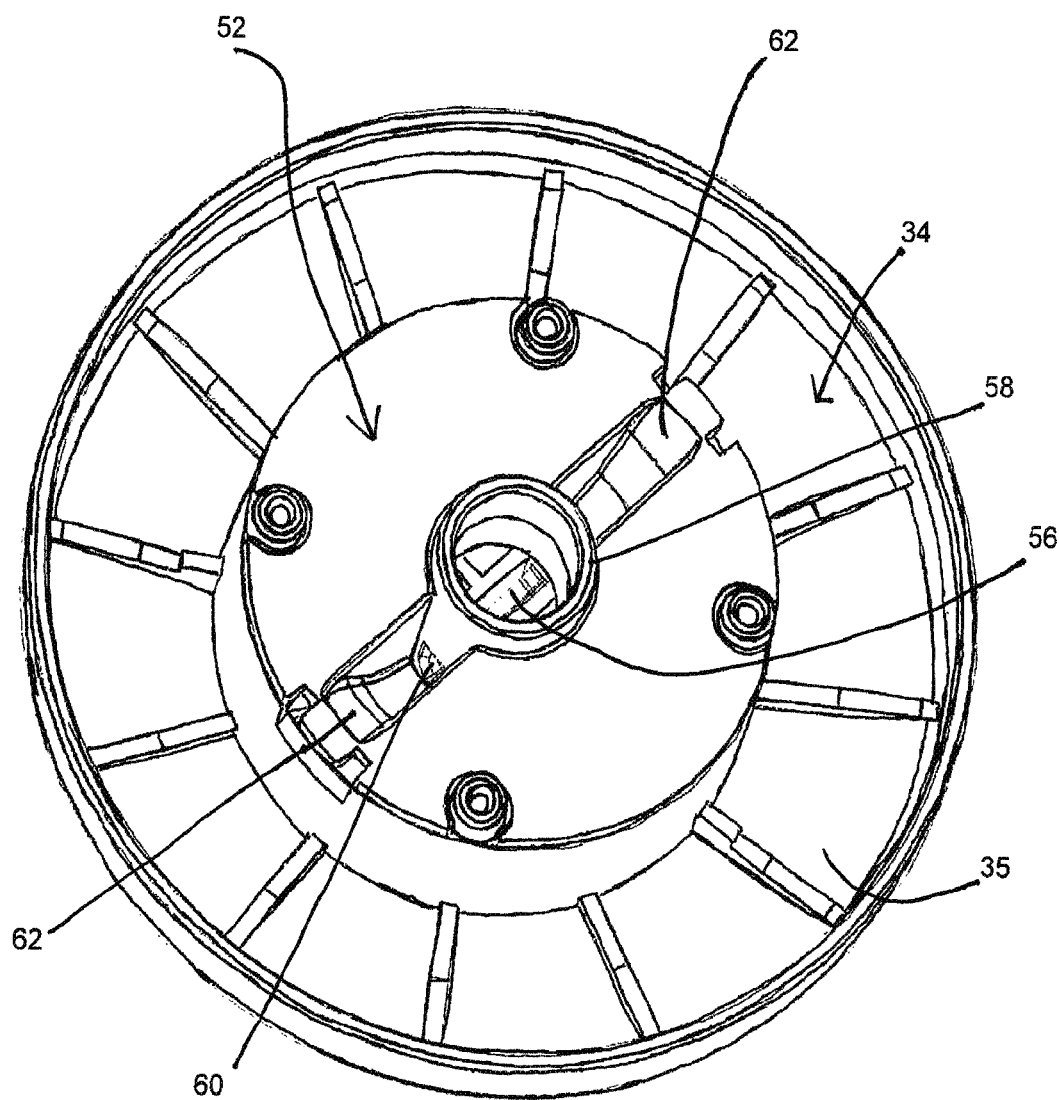
FIG. 14 is an upper perspective view of the bump knob with the channel cover installed.
Figure 15:
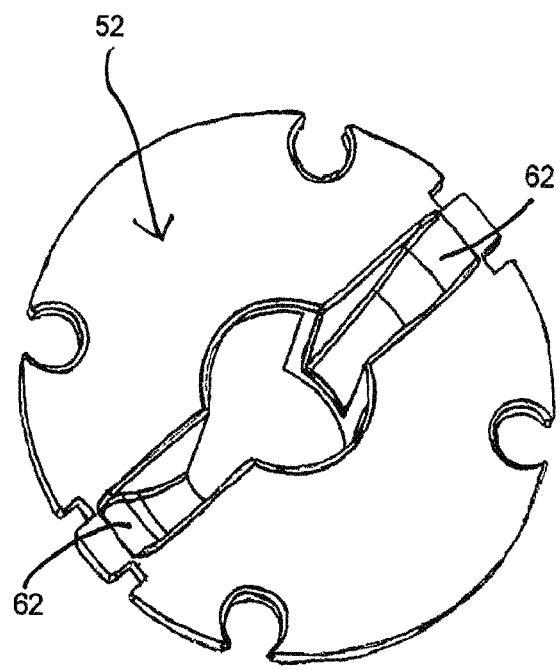
FIG. 15 is an upper perspective view of the channel cover.
Figure 16:
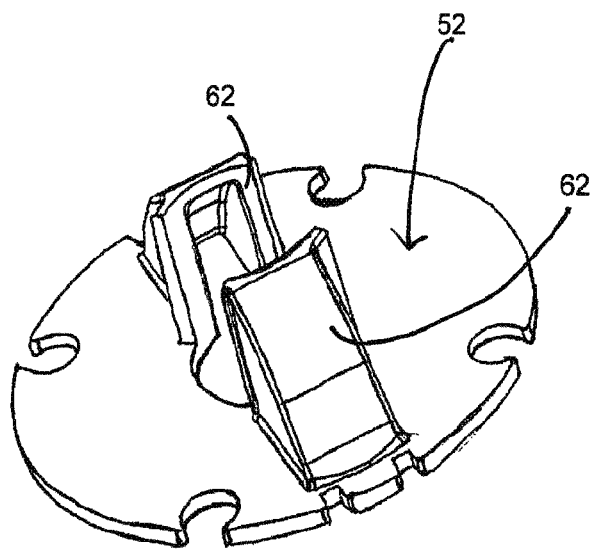
FIG. 16 is a lower perspective view of the channel cover.

Referring to FIGS. 7A through 19, the second assembly consists of the bump knob 34, the spool 48, a metal washer 50, a channel cover 52, a lower housing cover 40, and four screws 54, 54a, 54b and 54c. The channel cover 52 is shown in FIGS. 15 and 16. The full-faced bump knob 34 is shown in FIGS. 12 and 13. Located in the center of the bump knob 34 is a raised cylindrical wall 56 of a raised cylinder 58. This raised cylindrical wall 56 will interface with the shaft extension 18 to minimize vibration. The interaction helps to keep the bump knob 34 spinning on the axis of rotation of the trimmer head 10, which is necessary to prevent vibration.

Also on the inside surface 35 of the bump knob 34 is the lower portion of raised cylindrical wall 56 which is connected with openings 60, located on either side of the raised cylinder 58. The channel cover 52 is inserted within the central barrel of the spool 48 and is also attached to the bump knob 34. The central barrel of the spool 48 consists of an upper central barrel 57a and the lower central barrel 57b. As shown in FIG. 14, the channel cover 52 has ramp portions 62, which connects with the raised cylindrical wall 56 of the raised cylinder 58. These ramp portions 62 along with the lower portion of the raised cylindrical wall 56 represent the lower portion of the channel that contributes to a passageway to guide the trimmer line from one side of the spool 48 to the other.

Figure 10:
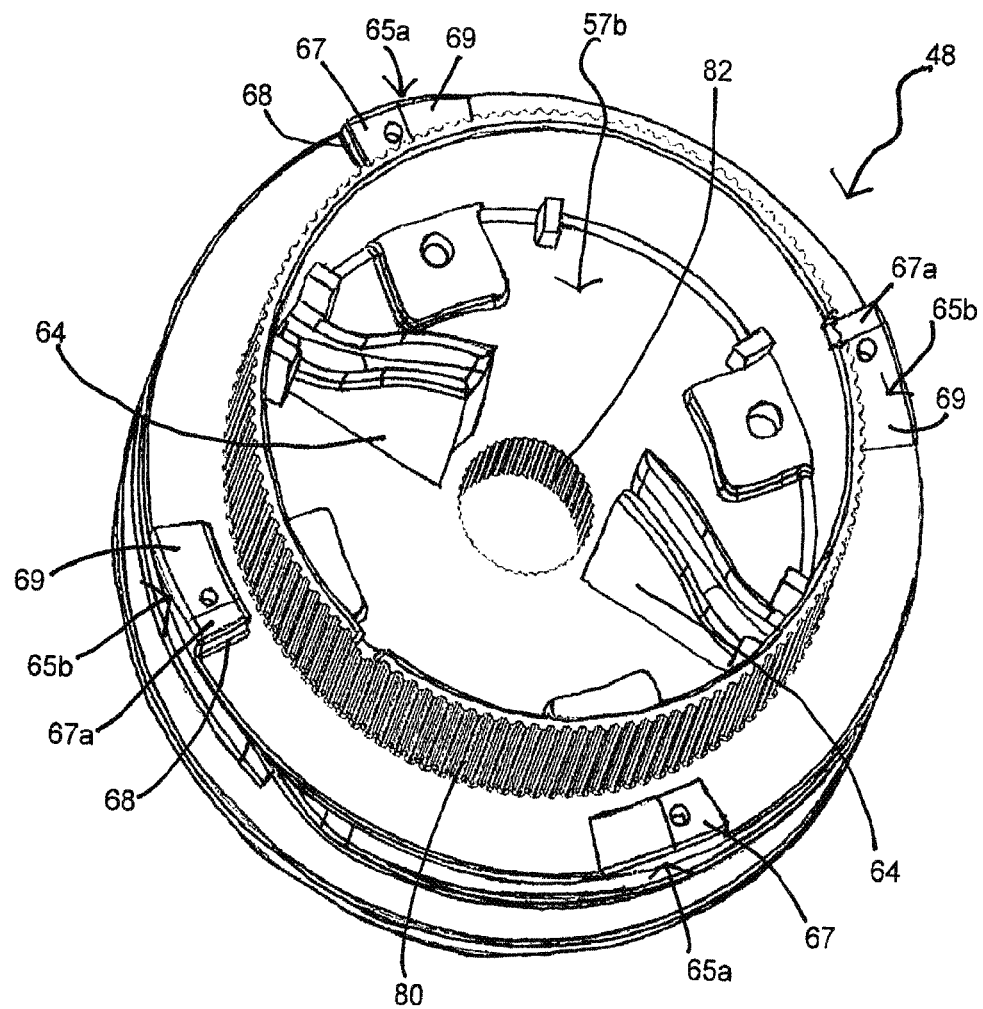
FIG. 10 is a lower perspective view of the spool used in the assembly shown in FIG. 7A.
Figure 11:
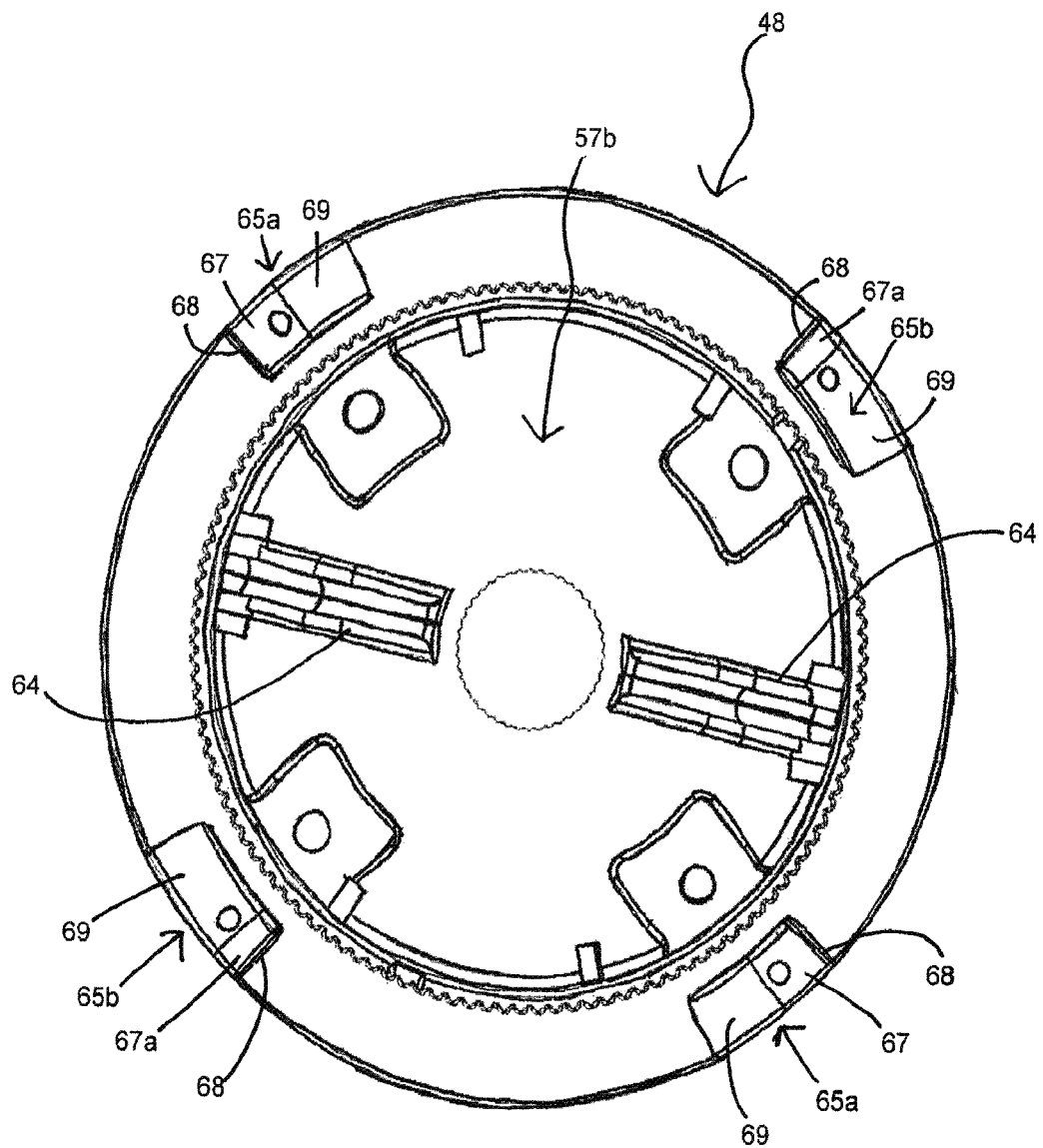
FIG. 11 is a bottom view of the spool shown in FIG. 10.
Figure 17:
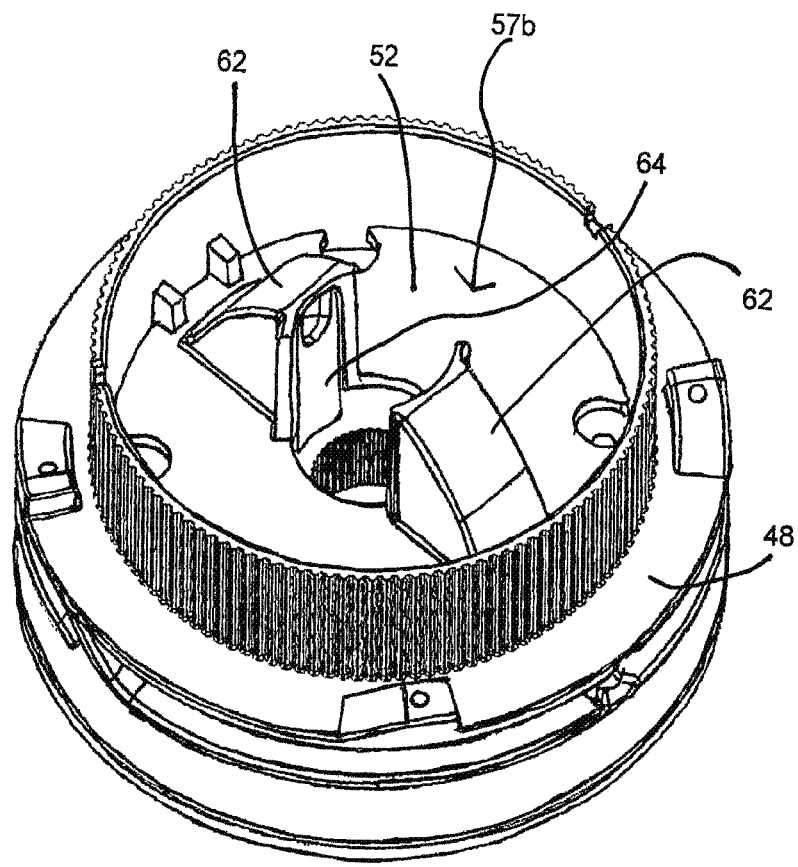
FIG. 17 is a lower perspective view of the spool shown with the channel cover in install position.

The spool 48 is further depicted in FIGS. 10 and 11. The ramp portions 64 of the spool 48 are located on the lower side of the spool 48, within the lower central barrel 57b. These ramp portions 64 mate with the channel cover 52 as shown in FIG. 17. When fully assembled, the ramp portions 64 from the spool 48, the ramp portions 62 from the channel cover 52, and the raised cylindrical wall 56 of the bump knob 34 form a line passage which allows the trimmer line to pass from one side of the spool 48 to the other.

Figure 8:
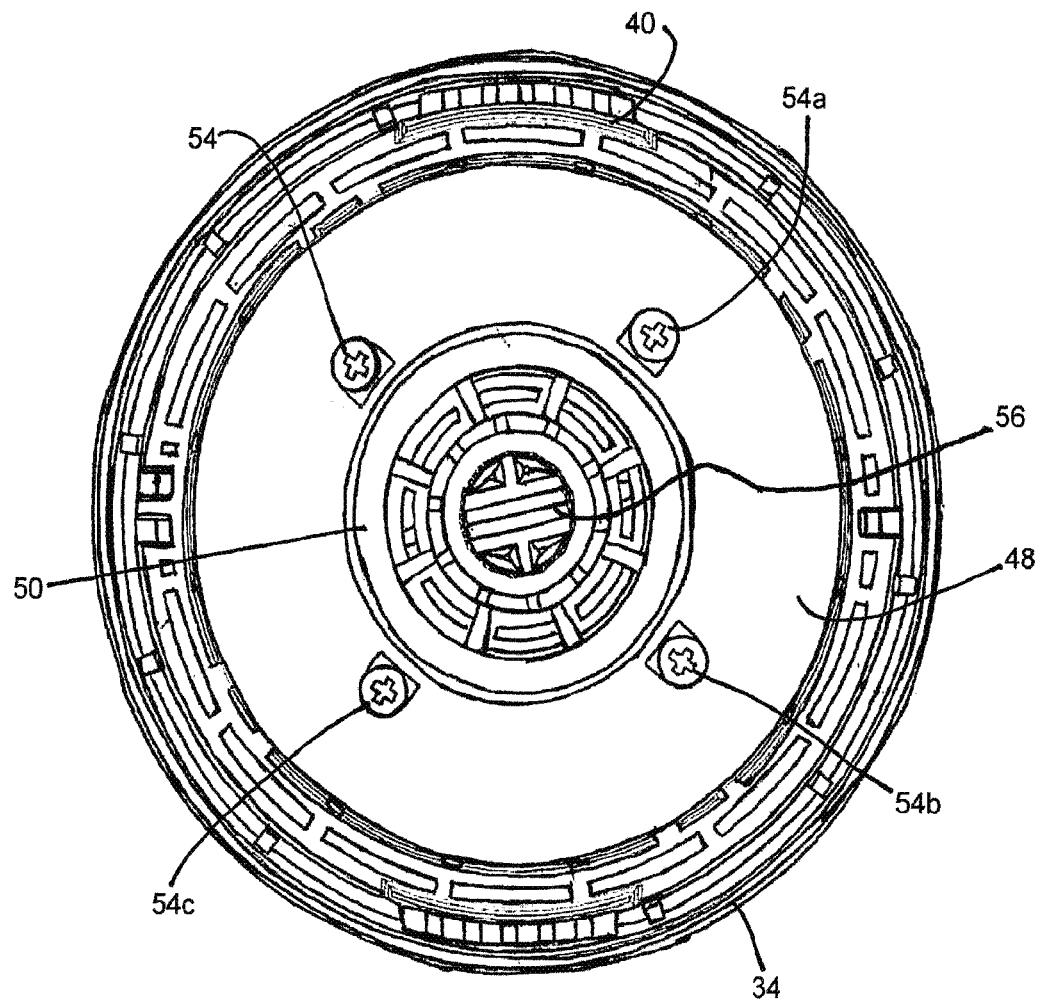
FIG. 8 is a top view of the assembly shown in FIG. 7A.
Figure 19:
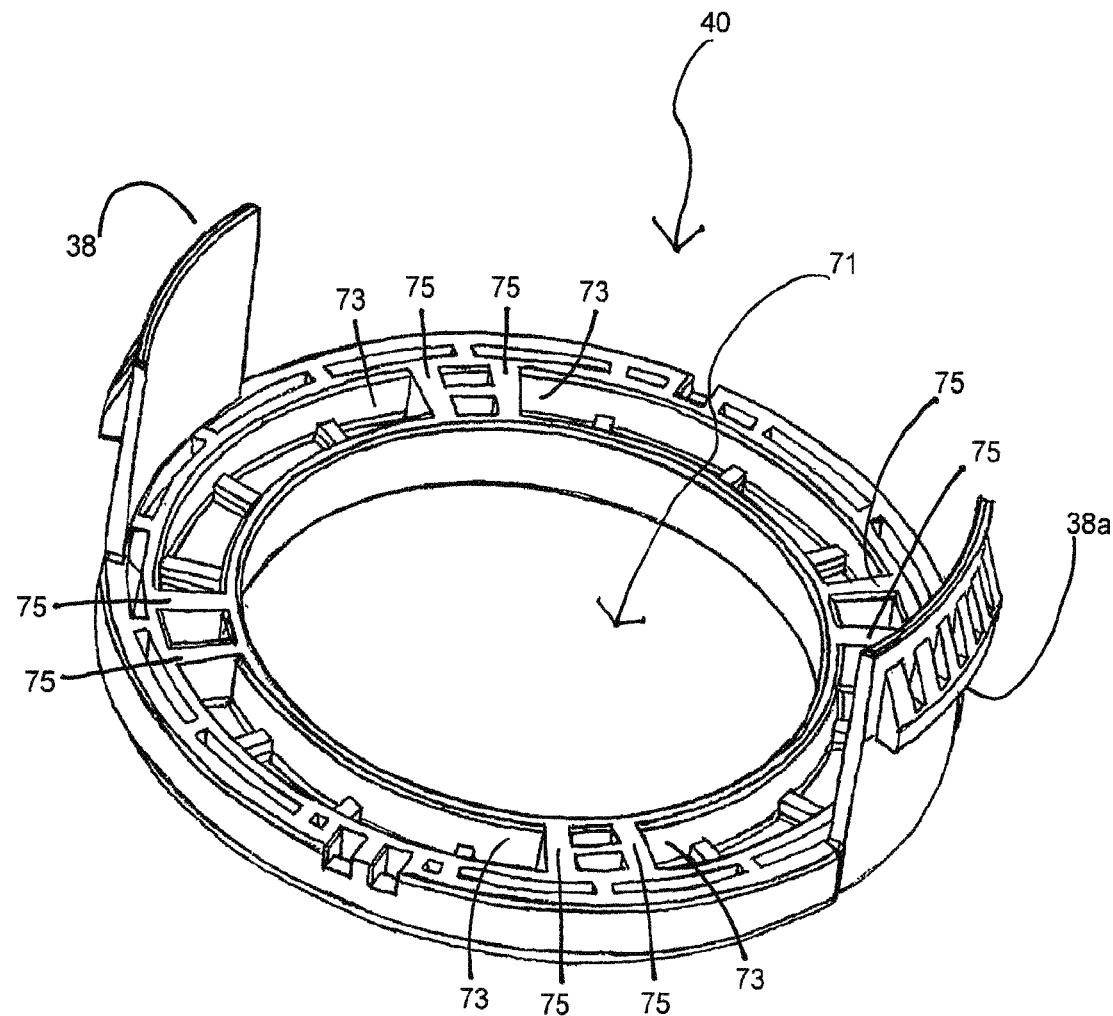
FIG. 19 is an upper perspective view of the lower housing.

The completed assembly of the bump knob 34, channel cover 52, spool 48, and lower housing cover 40 are shown in FIGS. 7A, 7B, and 8. Four screws 54, 54a, 54b and 54c connect these parts together such that the bump knob 34, channel cover 52, and the spool 48 are fixed rotationally and can rotate freely when the ramp projections 42 are spaced apart from the ramp projections 45 of the spool 48 and when ramp projections 65a and 65b are spaced apart from the lower hosing cover 40. The four screws 54, 54a, 54b, and 54c, are received in the spool 48 in channels 66, 66a, 66b, and 66c respectively. The bump knob 34, channel cover 52, and the spool 48 shown in FIG. 9 as being fixed rotationally while the lower housing cover 40 is shown in FIG. 19.

There is also the metal washer 50 inserted into a recess in the upper side of spool 48 so that the compression spring 20 can rotate on the surface of the washer 50 with minimal frictional resistance.

As shown in FIGS. 10 and 11, the spool 48 further contains outer ramp projections 65a and 65b. The outer ramp projections 65a includes a flat segment 67, a vertical segment 68 and a sloped segment 69 whereas the outer ramp projections 65b include a flat segment 67a, a vertical segment 68, and a sloped segment 69. The flat segment 67 of the outer ramp projection 65a is longer than the flat segment 67a of the outer ramp projection 65b. As shown in FIG. 19, the lower housing cover 40 contains a central aperture 71, vertical walls 75, and curvilinear slots 73, upon which the outer ramp projections 65a and 65b of the spool 48 interface. The vertical walls 75 and curvilinear slots 73 interact with the outer ramp projections 65a and 65b to allow the user to rotate the spool 48 in one direction but not the other. These features also force the user to wind the trimmer line on the spool 48 in just one direction.

To join the lower assembly 40 and the main housing 12, the tabs 38, 38a on the lower assembly 40 (shown in FIG. 7) are placed into the main housing 12 until the tabs 38, 38a snap into the openings 36, 36a located in the sidewall 16 of the main housing 12.

The spool 48 has short channels 72 located between flanges 74 and 76 of the spool 48 (see FIGS. 7A and 7B). These short channels 72 connect with the line passage formed by the ramp portions 64 from the interior of the spool 48; the ramp portions 62 from the channel cover 52, and the raised cylindrical wall 56 of the bump knob 34. When the lower assembly 40 and the main housing 12 are connected, the user can rotate the internal spool 48 by grasping and rotating the bump knob 34. First the user must align the short channels 72 with the eyelets 14, 14a. Then one end of a piece of trimmer line can be pushed into one of the eyelets 14 or 14a, into the short channels 72, through the line passage and out the passageway located on the opposite side of the spool 48, and out through the second eyelet 14a or 14. The user would then pull the line until equal amounts of line extend from the trimmer head 10. The user can then rotate the bump knob 34. This in turn rotates the spool 48, causing the line to wind onto the spool 48 between flanges 76 and 78.

Figure 9:
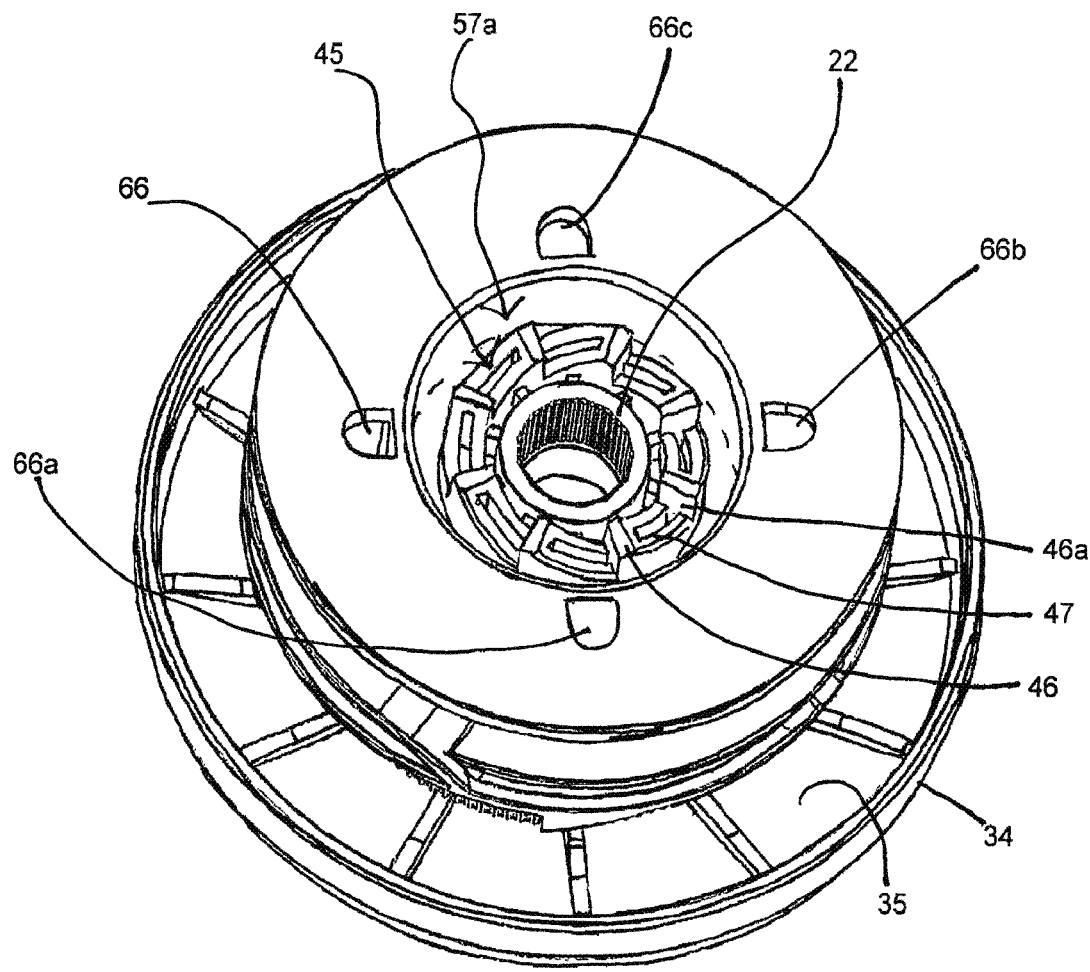
FIG. 9 is an upper perspective view of the assembly in FIG. 7A with the lower housing cover removed.

When the bump knob 34 is bumped on the ground, this action causes upward movement of the bump knob 34 and the other components depicted in FIG. 9, as well as compression of the spring 20. The raised cylinder 58 on the bump knob 34 slides upward on the shaft. The ramp projections 45 located on top of the spool 48 impact the ramp projections 42 located in the main housing 12. The upward movement forces the two sets of ramp projections 45 and 42 to slide against each other, forcing the spool 48 to rotate relative to the main housing 12 in a controlled predetermined direction. It is this controlled directional relative rotation that forces the spool 48 to rotate in such a direction that the trimmer line is eased out of the trimmer head 10, as opposed to being pulled. If the length of line extending from the trimmer head 10 is less than 2 inches just prior to the bumping of the bump knob 34 on the ground, then this indexing action may be the primary means of indexing the trimmer line. If the length of line extending from the trimmer head 10 is 3 inches or more, then centrifugal force and/or air drag will also assist in indexing the line.

Figure 3:
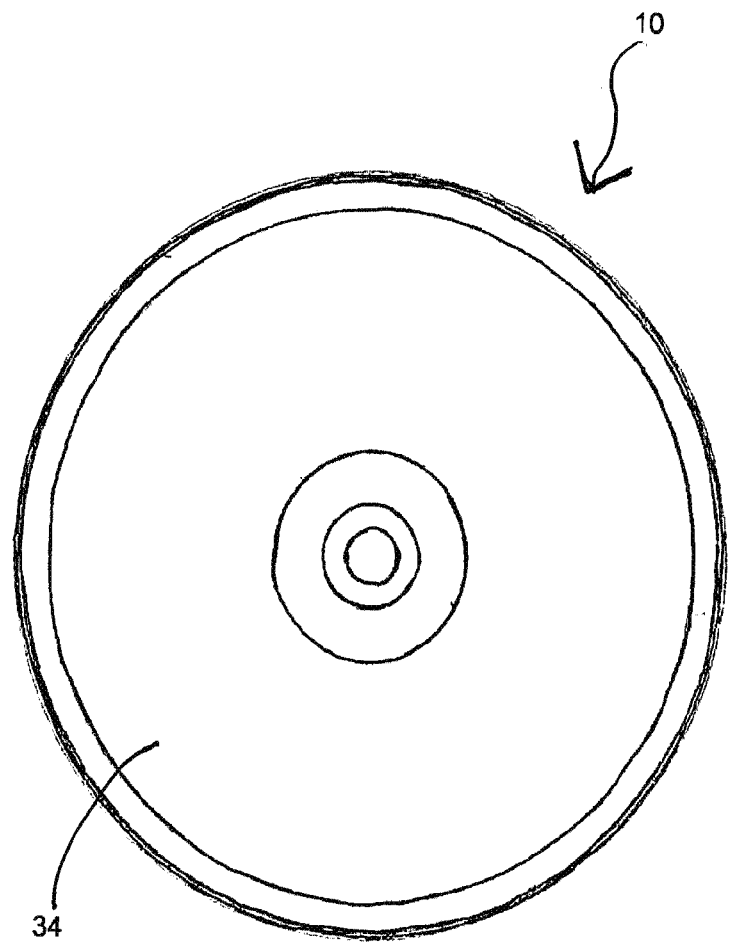
FIG. 3 is a bottom view of the trimmer head in FIG. 1.

In this embodiment, several problems are solved. First, the vibration is controlled because the bump knob 34 and spool 48 are forced to rotate on the same axis of rotation as the main housing 12 due to the interaction of the end of the shaft extension 18 which extends through the central barrel of the spool 48 and into the raised cylindrical wall 56 of the bump knob 34. Second, the trimmer head 10 is of the easy load type with a line passage passing from one side to the other side of the spool 48 where the line passage passes through the axis of rotation of the trimmer head 10. Additionally, the bump knob 34 is as wide as the main housing 12 of the head (full-faced bump knob 34). FIG. 3 shows the full size of the bump knob 34. Lastly, the trimmer line can be forced from the trimmer head 10 by the interaction of ramp projections 42 and 45; the trimmer head 10 does not rely upon centrifugal force and wind drag alone to pull the line from the trimmer head 10. Also notable in the FIGS. is that the trimmer head 10 has essentially been sealed. Other than the eyelets 14, 14a, there are no openings once the trimmer head 10 is mounted on the trimmer machine.

Another improvement incorporated into the head consists of ridges 80 and 82 located along the circular surfaces of the spool 48. These ridges 80 and 82 aid in minimizing friction during rotation of the spool 48 related to the shaft extension 18 and the lower housing cover 40.

The orientation of the sloped segments of ramp projections 42, 45 and 65a, 65b must be configured during the injection molding of the trimmer head 10 depending on whether the trimmer head 10 is to function with a trimmer machine that operates clockwise (CW) or counterclockwise (CCW). This first embodiment is not designed to function as a bi-directional trimmer head. Likewise, the shaft 18 which is insert molded must be manufactured with left handed (LH) treads if the trimmer head 10 is to be attached to a CCW rotating trimmer machine, and with right-handed (RH) threads if the trimmer head 10 is to be used with a CW rotating trimmer machine. In the above discussion and throughout this specification, the rotational direction of the trimmer is based upon the perspective of the user looking down at the trimmer head 10.

The external view of the trimmer head 10 (FIGS. 1-4) would not change whether the head is configured to be rotated CW or CCW. The bump knob 34, main housing 12, eyelets 14, 14a, spring 20, and line channel cover 52 do not need to be reconfigured. The ramps depicted in FIGS. 5, 6A, 7A, 9, 10, 11, and 17 are oriented for a trimmer head that would be mated to a CCW rotating trimmer. The ramps depicted in FIGS. 6B and 7B are oriented for a trimmer head that would be mated to a CW rotating trimmer.

For trimmer head 10 configured for a CCW rotating trimmer machine, the spring 20 will push the washer 50 and thus the spool 48 away from the surface 24 of the main housing 12 and against the lower housing cover 40. The two sets of equally spaced and opposing ramp projections 65a and 65b on the bottom of the spool will be recessed into the curvilinear slots 73 (FIG. 19), as depicted in FIGS. 7A and 7B. Additionally, the vertical segment 68 of ramp projections 65a and 65b will be pressed against the vertical walls 75 which terminate the curvilinear slots 73. For this embodiment, when the trimmer head 10 is bumped on the ground, the spool 48 and bump knob 34 rise, compressing the spring 20 until the ramp projections 65a and 65b clear the vertical walls 75 of the lower housing cover 40. At this point, the spool 48 and bump knob 34 are able to rotate relative to the main housing 12 and thus release line out of the trimmer head 10. If there is sufficient friction between the bump knob 34 and the ground, then this contact will apply a force on the bump knob 34 to decelerate its rotation relative to the main housing 12. Shortly after bumping the trimmer head 10, the spring 20 will push the spool 48 downward and away from upper wall 24 of the main housing 12; and, the ramps 65a and 65b will again recess into the curvilinear recesses 73. Once the vertical segments 68 contact the vertical walls 75 of the lower housing cover 40, the spool 48 and bump knob 34 will engage with the lower housing cover 40 and all components will once again be rotating at the same relative speed. This is the locked position. This cycle is repeated every time the trimmer head 10 is bumped.

When the trimmer head 10 is in the locked position, the plurality of ramp projections 42 and 45 are in a precise overlapped position such that when the spool 48 rises from being bumped, the plurality of ramp projections 42 and 45 contact such that the most extending surfaces of one plurality of ramp projections slide on the sloped surface of the other plurality of ramp projections, forcing the rotation of the spool 48 relative to the main housing 12. This forced rotation is in a direction that causes trimmer line to be pushed out of the main housing 12. The advantage of this feature is that if the trimmer line extending from the main housing 12 is too short to be affected by centrifugal force and air drag, then the trimmer line can still be extended from the main housing 12.

Other than the improvements listed above, the indexing of the head is performed using the same method described in the prior art. In summary, this embodiment of the present invention is an easy-load bump head in combination with a shaft to control vibration, the shaft is fixed to the main housing 12 and dynamically connected to the bump knob 34, a the passageway for easy loading of the trimmer line which connects the two opposed sides of the trimmer head 10, the passageway passing through the axis of rotation and below the end of the shaft, and plurality of ramp projections 42 and 45 utilize the bumping energy to force the incremental discharge of trimmer line.

Figure 20:
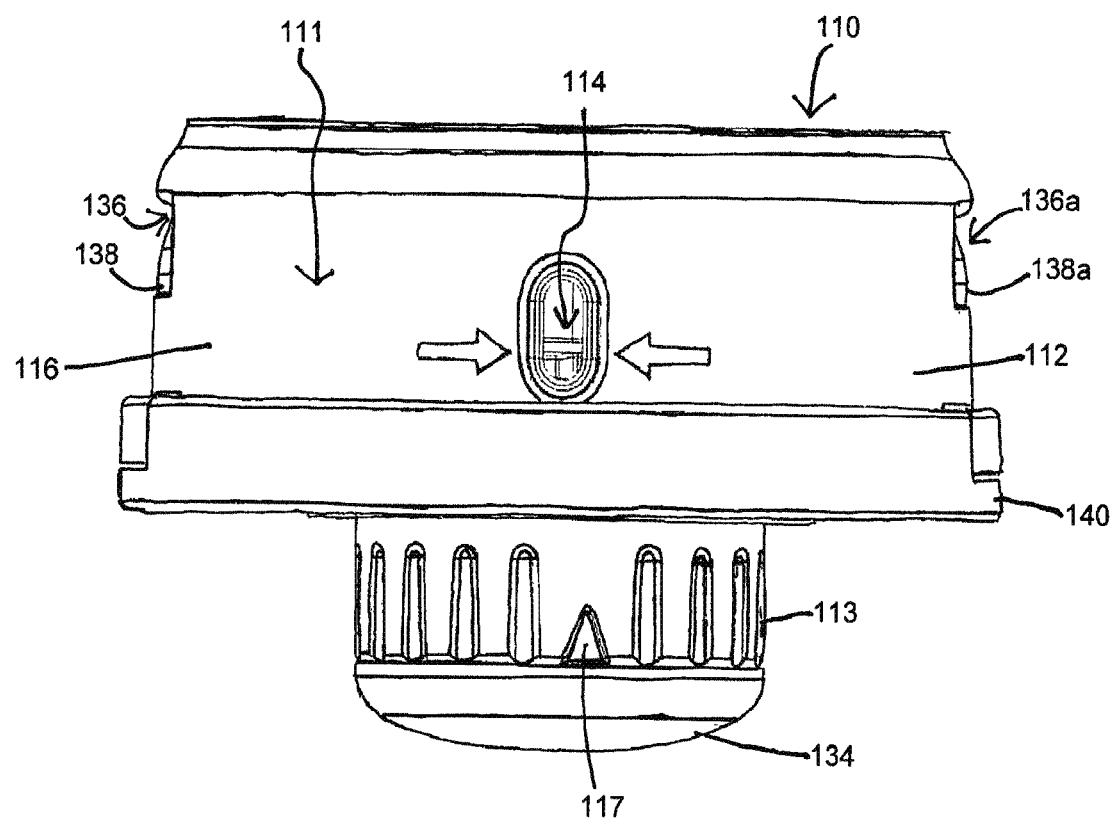
FIG. 20 is a side elevation view of a second embodiment of a trimmer head according to the concepts of the present invention.
Figure 21:
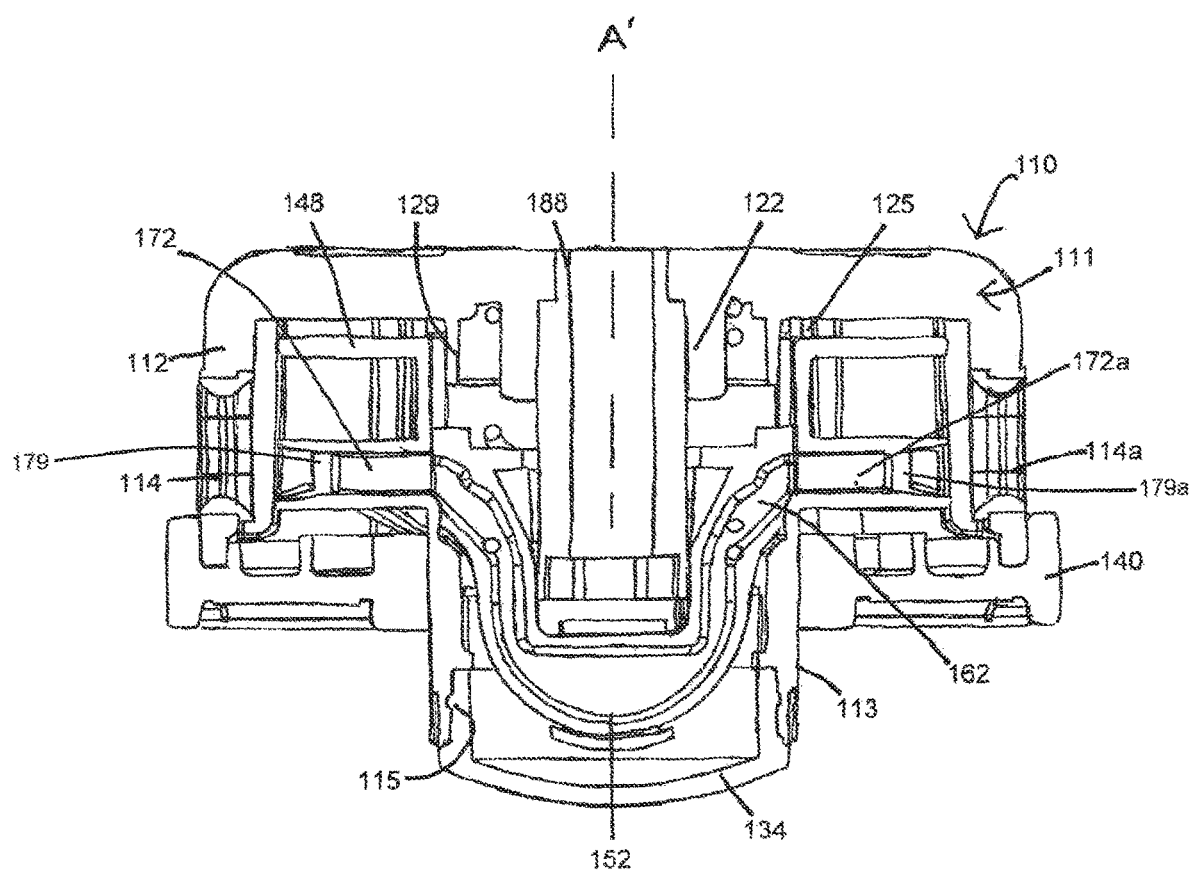
FIG. 21 is a sectional perspective view of the trimmer head of FIG. 20.

A second representative embodiment of a trimmer head according to the concepts of the present invention is designated generally by the numeral 110 in FIGS. 20 and 21 herein. This embodiment of the trimmer head 110 is designed to be attached to a string trimmer utilizing a standard assortment of fasteners as would be normally used to fasten a trimmer head to a trimmer shaft. Commonly, the fasteners all have 16 mm or larger hex heads. Some could have left-handed threaded attachments, while others could have right-handed threaded attachments, with a variety of thread sizes offered. Thus, this embodiment would require the consumer to match the appropriate trimmer head fastener to the trimmer shaft for proper attachment of the trimmer head to the trimmer shaft. No shaft extension is required in this embodiment.

Trimmer head 110 also generally includes a housing 111, an indexing knob 113 and a bump knob 134. A spool 148 is also generally included in the trimmer head 110 of the present invention. Bump knob 134 is unique in that it may rotate independently of the housing 111, indexing knob 113, spool 148 or any of the other major components of the trimmer head 110. That is, the bump knob 134 is free to rotate about the same axis A' of rotation as the trimmer shaft, and does so independently of the trimmer shaft, housing 111, indexing knob 113, or spool 148. Likewise, the bump knob 134 by design can stop rotating without significantly impacting the movement of the other parts of the trimmer head 110.

Figure 32:
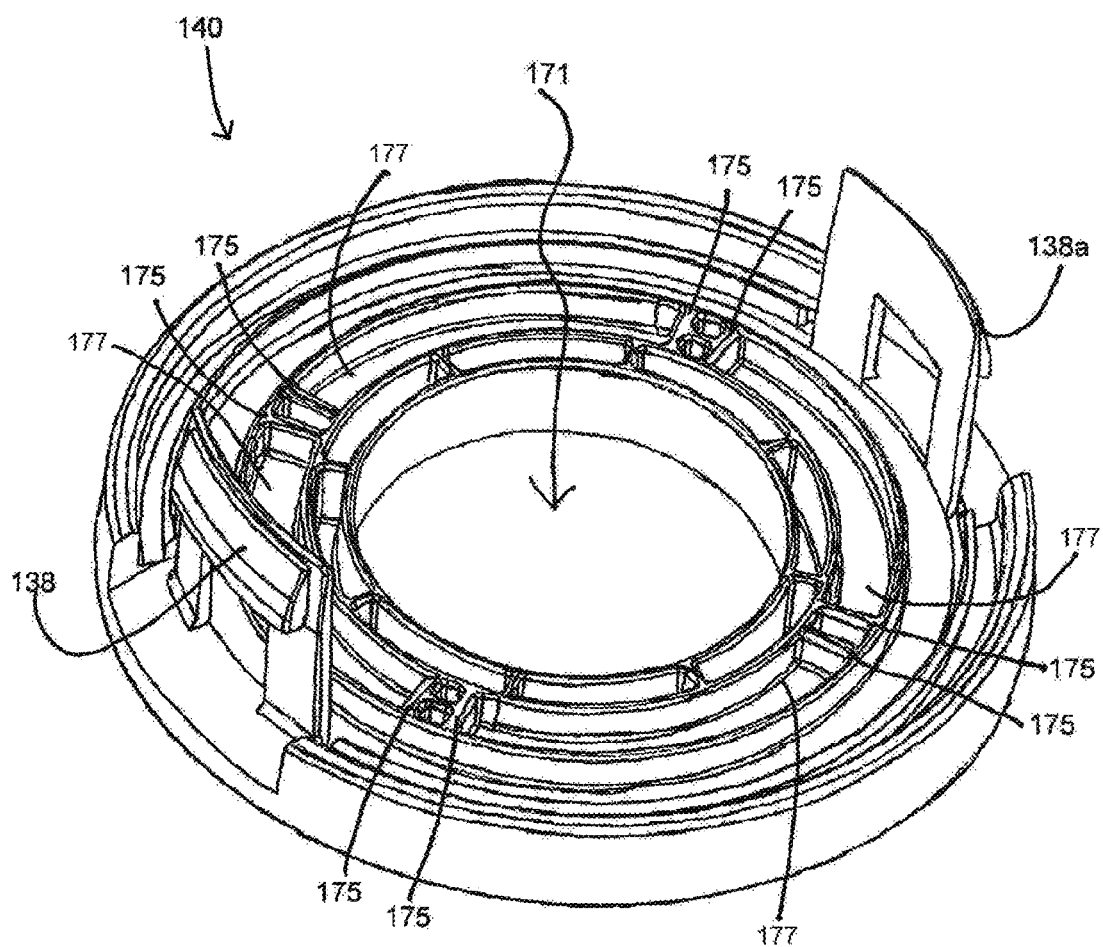
FIG. 32 is a perspective view of the lower housing cover of the trimmer head of FIG. 20.

Housing 111 includes a main housing 112 and a lower housing cover 140. The main housing 112 and the lower housing cover 140 define the internal volume of the housing 111 and encase at least the spool 148 therein. The main housing 112 and the lower housing cover 140 are connected by tabs 138, 138a located on opposite sides of the lower housing cover 140 relative to the circumference of the housing 111, as can be seen in at least FIGS. 23 and 32. More specifically, these tabs 138, 138a extend upwardly into the interior of the main housing 112, to be received by openings 136, 136a in the sidewall 116 of the main housing 112. Thus, tabs 138, 138a are used to attach the lower housing cover 140 to the main housing 112. Thus, should a user desire to separate the main housing 112 from the lower housing cover 140 in order to view or otherwise repair or replace one or more of the components within the housing 111, the user simply needs to press the tabs 138, 138a essentially simultaneously toward the center of the trimmer head 110 and pull the main housing 112 from the lower housing cover 140.

The housing 111, specifically the main housing 112, also includes a pair of opposed eyelets, 114, 114a in the sidewall 116 through which a trimmer line (not shown) may be discharged during cutting of vegetation. The eyelets 114, 114a are shown to be oval or oblong in shape, but may take any shape useful in the art, including, for example, round in shape. The eyelets 114, 114a are shown as located on the main housing 112.

Figure 22:
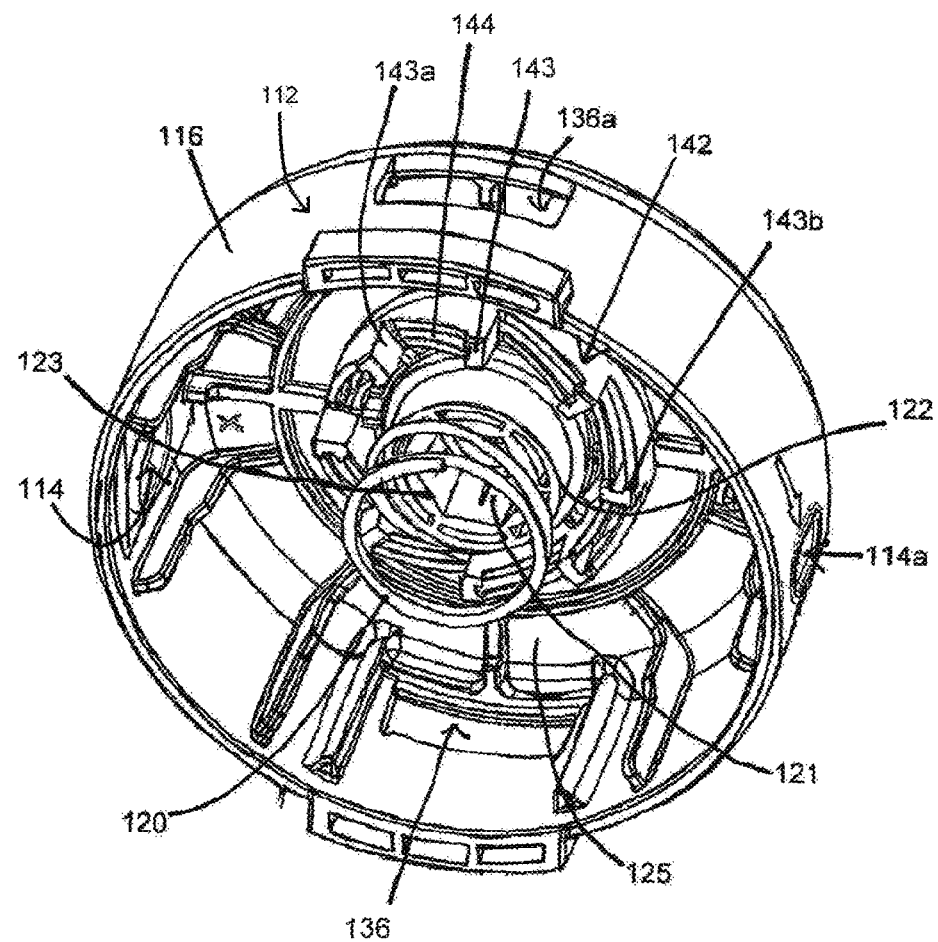
FIG. 22 is a perspective view showing the interior of the main housing of the trimmer head of FIG. 20.

The main housing 112 of the trimmer head 110 is depicted in FIG. 22 with just a biasing spring 120 and eyelets 114 and 114a installed. The consumer would attach the housing 111 to the stem of their trimmer by placing the appropriate nut or bolt (not shown) into a hexagonal cavity 123. There is a central bore 121 through the top of the main housing 112 in the middle of the hexagonal cavity 123 through which the stem of the trimmer or of a bolt (not shown) would pass. The hexagonal cavity 123 is located in a post 122 extending into the main housing 112 from the interior top surface 125 of the main housing 112. The biasing spring 120 may then be provided that is of a suitable size and diameter so that one end rests snugly within the space created between ramp projections 142 and the post 122. In this embodiment, the other end of the biasing spring 120 will rest on a line channel cover 152 within a center barrel 157a,b of the spool 148 to compress the spool 148 against the lower housing cover 140.

Figure 23:
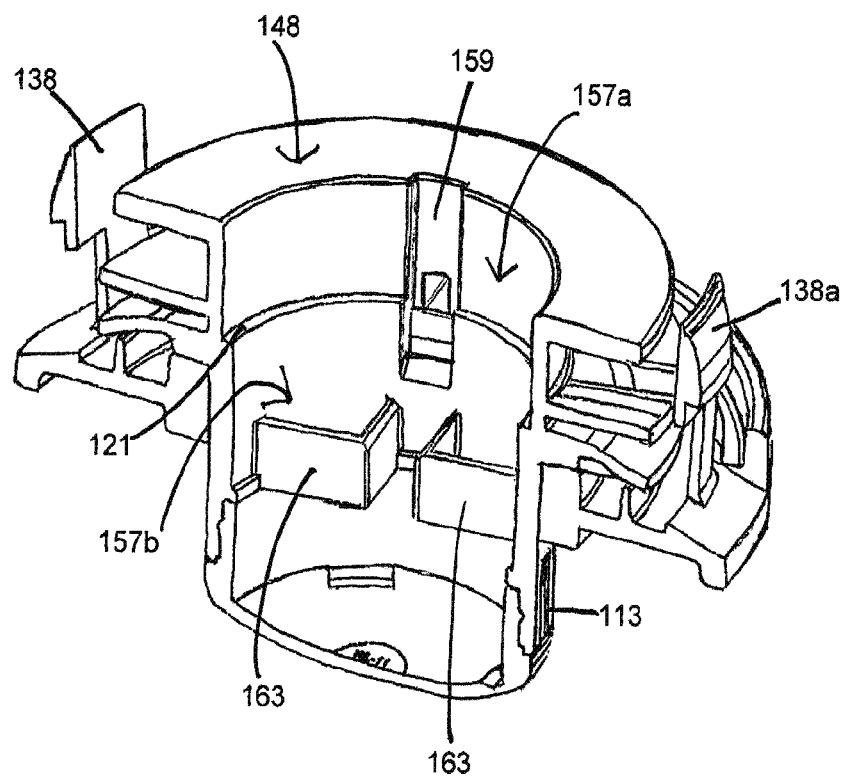
FIG. 23 is a sectional perspective view of the spool, indexing knob, and lower housing cover of the trimmer head of FIG. 20.
Figure 24:
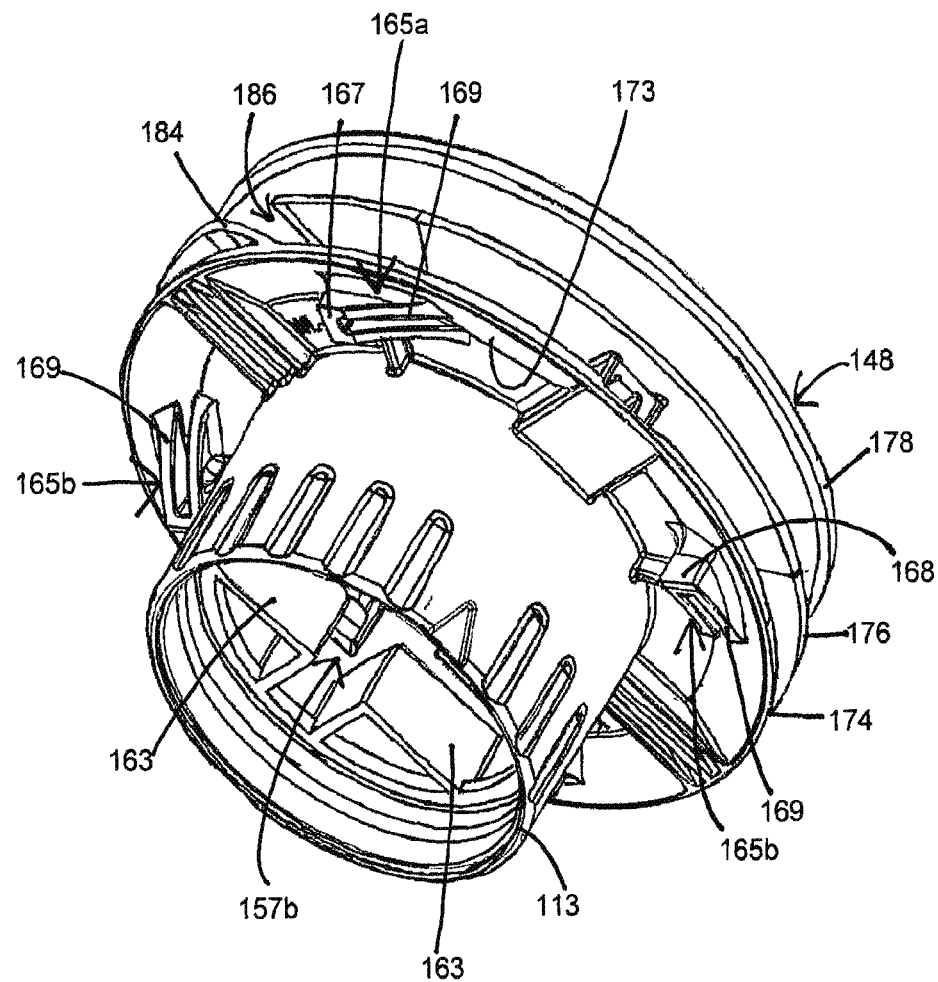
FIG. 24 is a perspective view of the integral indexing knob and spool of a second embodiment.
Figure 25:
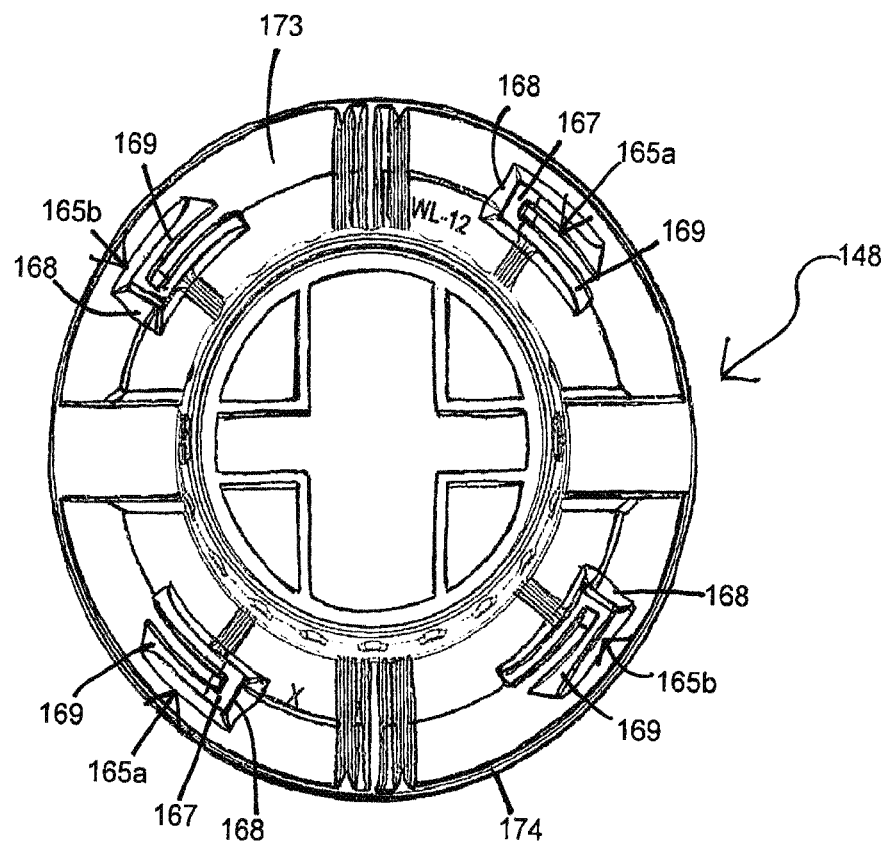
FIG. 25 is a bottom plan view of the spool of the second embodiment trimmer head in accordance with the concepts of the present invention.
Figure 27:
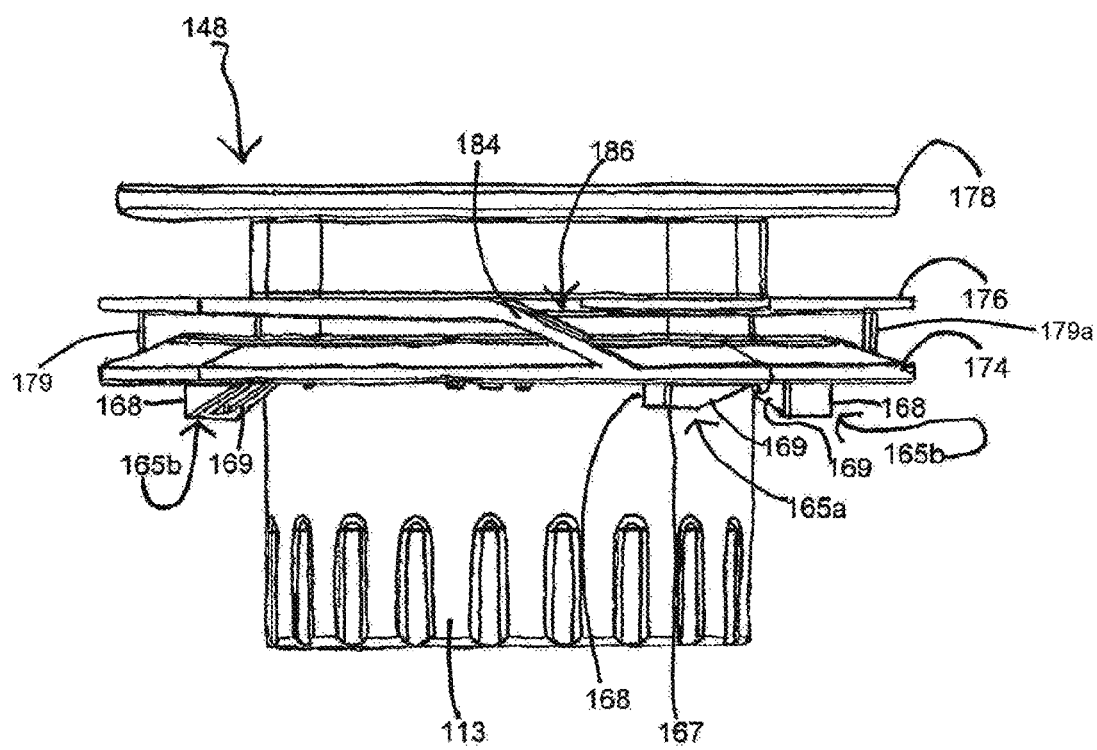
FIG. 27 is a side elevation view of the integral indexing knob and spool of FIG. 24.

As shown in FIGS. 23, 24 and 27, the spool 148 is provided as being integrally molded with indexing knob 113 as one piece. In an alternative embodiment, the spool 148 and the indexing knob 113 may be two or more parts, with the spool 148 fastened to the indexing knob 113 by any means known in the art. The simplest means would be simply interlocking tabs to keep the two parts 13, 148 rotationally locked. Preferably, the two components should be fastened such that the spool 148 moves up and down and rotationally together with the indexing knob 113.

The spool 148 includes a central barrel that is larger than the central bore 121. The central barrel of the spool 148 consists of an upper central barrel 157a and the lower central barrel 157b. The line channel cover 152 is designed to be inserted within the central barrel of the spool 148. There are two opposed grooves 159 along opposite sides of the upper central barrel 157a of the spool 148 along with four sets of angled ribs 163 within the lower central barrel 157b which hold the line channel cover 152 in its desired position so that an internal line channel passageway 162 (see FIG. 21) of the line channel cover 152 aligns with two line channels passages 172 and 172a on the opposite sides of a middle flange 176 of the spool 148. An advantage of this design approach for the line channel cover 152 is that it can be removed and replaced if damaged. Another advantage is that two line channel assemblies could be provided with the trimmer head 110. For example, a second cover could be supplied that has a line channel straight across rather than dipping downward and back up. This would be an advantage in that trimmer line would be easier to insert, especially with larger line sizes. This alternate option could be used for straight shaft trimmers, which often use larger sizes of trimmer line. The design of the line channel cover 152 shown in FIG. 21 has been optimized for trimmers that have a long mounting stem. The entire unit shown in FIG. 23 is designed to be snap-fitted into the housing 111. Accordingly, when the main housing 112 and the lower housing cover 140 are snapped together by tabs 138, 138a, the unit shown in FIG. 23 will be held within the housing 111, except for the indexing knob 113 and bump knob 134, which extend through a central aperture 171 of the lower housing cover 140 (see FIG. 32).

Figure 31:
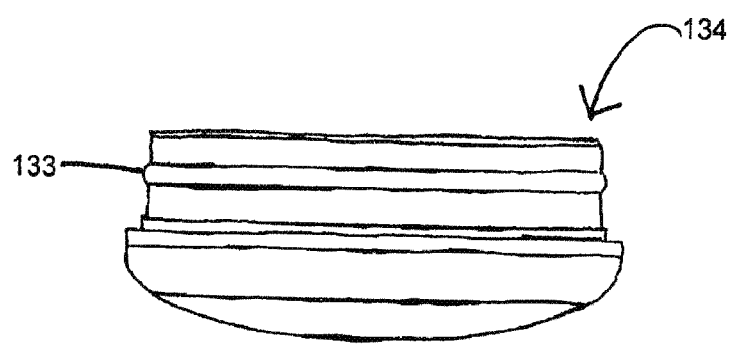
FIG. 31 is a side elevation view of the bump knob of the trimmer head of FIG. 20.

With respect to the bump knob 134, it is disposed within the indexing knob 113. There is a circular groove 115 positioned along the inside perimeter of the circular indexing knob 113. The bump knob 134, as shown in FIG. 31, has a corresponding circular protrusion 133 along its outside perimeter. The bump knob 134 and indexing knob 113 are sized such that when the bump knob 134 is pressed into the inside of the indexing knob 113, the two pieces snap together with protrusion 133 mating with groove 115. The bump knob 134 is then able to rotate freely.

When the trimmer head 110 is bumped on the ground, the bump knob 134 comes in contact with the ground. Its rotational speed will decrease and possibly stop depending on the amount of time that the bump knob 134 is pressed against the ground. However, the change in rotational speed of the bump knob 134 has a negligible effect on the rotational speed of the spool 148. During the bumping action, the spool 148, which normally is rotationally locked to the housing 111, is momentarily lifted and unlocked from the lower housing cover 140. During this moment of bumping, a plurality of ramp projections 145 within the center barrel 157 of the spool 148 contact the plurality of ramp projections 142 located on the main housing 112. As a result, the spool 148 is forced to spin in a predetermined direction. The spool cannot rotate freely in either direction. As a result of the rotational independence of the bump knob 134, the air drag and centrifugal force acting on the trimmer line (not shown) can pull additional line from the spool 148 whether the housing is rotating clockwise or counterclockwise. However, the centrifugal force and air drag alone are only effective in pulling line from the head if about 3 or more inches of line are extending from the trimmer head 110. The interaction of the plurality of ramp projections 145 within the center barrel 157 of the spool 148 and the plurality of ramp projections 142 located on the main housing 112 allow trimmer line to be released from the trimmer head 110 even if the length extending from the housing 111 is less than two inches.

The spool 148 generally includes at least three flanges 174, 176, 178 essentially parallel to each other. Between the middle flange 176 and one of either the uppermost 178 or lowermost 174 flanges (for this description the lowermost will be used), is a passageway comprising the line channels 172 and 172a. The line channels 172 and 172a are on opposite sides of the spool 148 and are in operative communication with the line channel passageway 162 of the line channel cover 152 such that a trimmer line inserted into one of the line channels 172 or 172a will travel through that line channel 172 or 172a, through the line channel passageway 162 of the line channel cover 152 and out the other line channel 172a or 172. In this embodiment, the middle flange 176 and the lower flange 174 form the top and bottom walls of the line channels 172 and 172a. There are also two upstanding side walls 179 and 179a to form the line channels 172 and 172a.

When the trimmer head 110 is fully assembled, the user aligns the arrow(s) 117 on the indexing knob 113 with the eyelet(s) 114, 114a. The consumer can then cut a length of trimmer line (not shown) up to about fifteen feet in length. The length of line that can be loaded depends on the capacity of the spool. One of the free ends of the trimmer line would be pushed through one of the eyelets 114 or 114a and into one of the line channels 172 or 172a. The line then travels down through the line channel passageway 162 of the line channel cover 152 and back up again till it enters the other line channel 172a or 172 located on the opposite side of the spool 148. Finally, the line passes through the opposing eyelet 114a or 114 located on the opposite side of the trimmer head 110.

Once the trimmer line is pushed through the line channels 172 and 172a and the passageway 162, the consumer can continue to pull the trimmer line through the trimmer head 110 until approximately half of the trimmer line is set forth on each side of the trimmer head 110. It is at this point that the consumer can turn the indexing knob 113 to wind the trimmer line onto the spool 148.

At this point, it is noted that, for the present embodiment, the spool 148 contains a set of, here, four outer ramp projections 165a and 165b, located on the bottom surface 173 of the lowermost flange 174. However, the number of ramp projections 165a and 165b could also be eight. In the ideal configuration, the number of ramp projections 165a and 165b on the bottom of the spool 148, the number of ramp projections 145 within the center barrel 157 of the spool 148, and the number of ramp projections 142 located on the main housing 112 would all be equal in number. For example, each plurality of ramp projections could have six ramp projections. However, the number of ramp projections 165*a* and 165*b* on the bottom of the spool 148 can be one half the numbers of ramp projections 145 within the center barrel 157 of the spool 148.

The outer ramp projections 165*a* include a flat section 167, a vertical segment 168, and a sloped segment 169. The flat section 167, the vertical segment 168, and the sloped segment 169 combine to form the wedge/ramp shape of the outer ramp projection 165*a*. The outer ramp projections 165*b* include a vertical segment 168 and a sloped segment 169. The vertical segment 168 and the sloped segment 169 combine to form the wedge/ramp shape of the outer ramp projection 165*b*. The outer ramp projections 165*a*, 165*b* located on the bottom surface 173 of the lower flange 174 of the spool 148 are biased by the spring 120 to interface with vertical walls 175 and curvilinear slots 177 of the lower housing cover 140 upon which the outer ramp projections 165*a* and 165*b* of the spool 148 interface. The vertical walls 175 and curvilinear slots 177 and the outer ramp projections 165*a* and 165*b* allow the user to rotate the spool 148 in one direction but not the other. These features also force the trimmer line to wind on the spool 148 in just one direction.

Because the bump knob 134 is not rotationally locked to the spool 148, there is no need to reconfigure the ramps 165*a* and 165*b* for CW versus CCW rotating trimmers. The user would always rotate the indexing knob 113 in a CCW direction (viewed from above) when loading the trimmer line; and, the spool 148 would always rotate CW to release the line (viewed from above) when releasing the line, regardless of the rotational direction of the string trimmer machine.

As shown in FIGS. 21 and 27, the upstanding side walls 179 and 179*a* to the line channels 172 and 172*a* are recessed slightly from the perimeter of the middle and lowermost flanges 176 and 174. As the spool 148 is rotated, the trimmer line is wrapped into the space between the middle and lowermost flanges 176 and 174 and to the left of one of the line channels 172 or 172*a*. The line then rises up on an inclining portion 184 connecting the lower and middle flanges 174 and 176, and passes through a gap opening 186 in the middle flange 176. The trimmer line winds in the space defined by the center barrel 157 of the spool 148 and the upper flange 178 and the middle flange 176. The advantage of this design is that the entry of the trimmer line is confined to the space closest to the center barrel 157. There is not a piece of line bending from a line channel exit on the perimeter of the flanges to the center barrel 157, and thus internal welding of the line is eliminated. This design also has the advantage that all four sides of the exit to the line channel extend close to the perimeter of the flanges. This makes feeding the line through the eyelets 114, 114*a* and into the line channels 172 and 172*a* easier for the user.

The inclusion of inclining portion 184 means that line can only be wound on the spool 148 if the spool 148 is turned in a direction such that the line wraps on the spool 148 in a direction from the channels 172, 172*a* leading to the inclining portion 184 such that the line can pass through the passageway 186. This same inclining portion 184 will block the passage of the trimmer line if the spool 148 is turned in the opposite direction during line loading. The indexing knob 113, and thus the spool 148, will always be rotated in a first direction for loading line, and will always rotate in the opposite second direction for release of line during the bumping action. The user would always turn the indexing knob 113 CCW to load the line and the spool 148 can only release the line by turning CW (when viewed from above), regardless of the rotational direction of the housing 111. In this example, if the spool 148 were rotating in the first direction when bumped, then the trimmer line would be wound further onto the spool 148 and the distal free ends of the trimmer line would be pulled into the trimmer head 110.

An alternate spool 148 design could have four flanges. The opposing line channels 172 and 172*a* would be placed between two middle flanges (176 and a second middle flange which is not shown). The space to the left of one line channel 172 or 172*a* could be designed with an inclining portion 184 connecting from the upper middle flange to the lower middle flange, with a gap opening 186 allowing the trimmer line to pass into the space defined by the center barrel 157 of the spool 148, the lowest flange 174, and the lower middle flange. The space to the left of the second line channel 172*a* or 172 could be designed with an inclining portion connecting from the lower middle flange to the upper middle flange, with the adjacent opening on the upper middle flange. This would allow the opposing end of the trimmer line to fill the space between the center barrel 157, the upper most flange 178, and the upper middle flange. This design would be an improvement over the prior art because the exit to the line channels 172 and 172*a* would have four sides all extending close to the perimeter of the flanges, and yet the initial wrap of the trimmer line on the center barrel 157 of the spool 148 would still occur at the surface of the center barrel 157.

Figure 28:
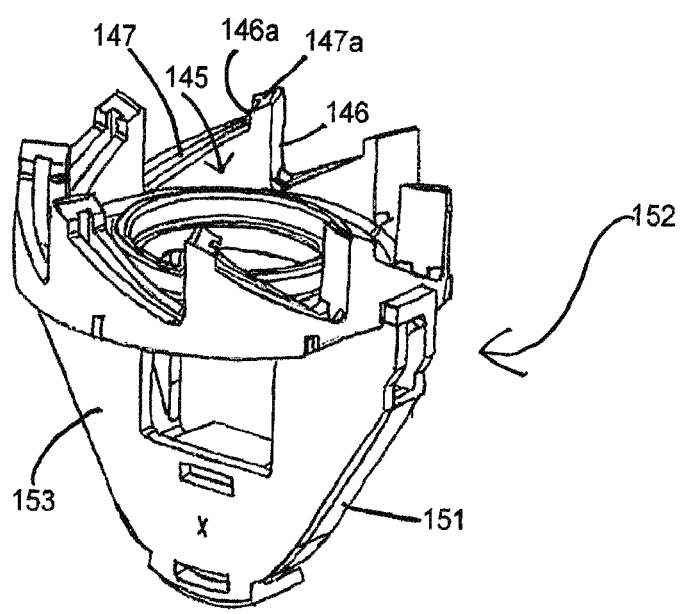
FIG. 28 is a perspective view of a line channel assembly of the second embodiment of the trimmer head in accordance with the present invention.
Figure 29:
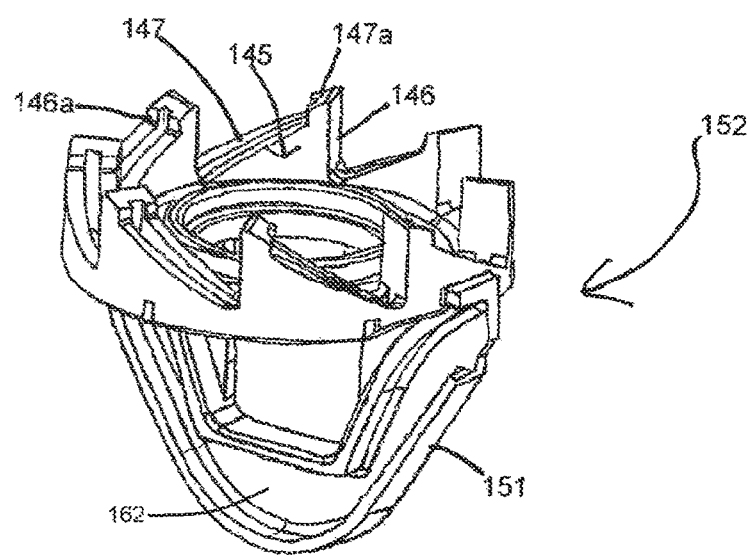
FIG. 29 is a perspective view of the main body of the line channel assembly of FIG. 28.
Figure 30:
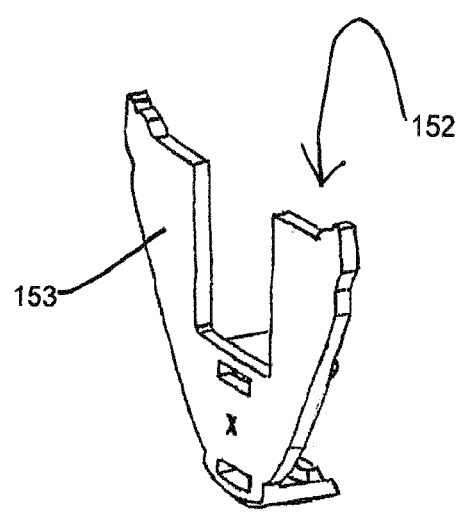
FIG. 30 is a perspective view of the cover of the line channel assembly of FIG. 28.

The line channel cover 152 is shown generally in FIG. 28. It is shown designed using two pieces 151 and 153. The main body 151 of the line channel cover 152 is shown in FIG. 29. The main body 151 contains the plurality; of ramp projections 145. The ramp projections 145 are symmetrically disposed at the same height around the main body 151 of the line channel cover 152, and each ramp projection 145 includes a first vertical segment 146, a second vertical segment 146*a* a first sloped segment 147, and a second sloped segment 147*a* which combine to form the wedge/ramp shape of the ramp projection 145. In some embodiments, the ramp projections contain the first flat segment, the second flat segment, the first sloped segment, and the second sloped segment. In yet other embodiments, the ramp projections contain a first flat segment, a second flat segment, a third flat segment, and a sloped segment. Three of the four walls of the line channel cover 152 are formed by the main body 151. The cover 153 for the line channel cover 152 is shown in FIG. 30, which supplies the fourth wall for the line passageway. Once assembled, line passageway 162 is formed between these two pieces. And, the line channel cover 152 can be positioned into the spool 148.

When the trimmer head 110 is loaded with line and rotated by a trimmer, there is sufficient resistance between the vertical walls 175 and curvilinear slots 177 of the lower housing cover 140 against the outer ramp projections 165*a* and 165*b*, such that the line is not released regardless of the direction of rotation. However, if the trimmer head 110 is bumped on the ground, then the spool 148 is lifted such that the spring 120 is compressed; and, the outer ramp projections 165*a* and 165*b* can clear the top of the vertical walls 175 regardless of the direction of rotation.

When the spool 148 is in the bumped or up position, then the spool 148 would normally turn in a direction determined by the centrifugal force acting on and the air drag pulling on the line, but only if a sufficient length of line is extending from the housing 111. Typically three or more inches of line should be extending from the housing 111 for the centrifugal force and air drag to be an effective means of pulling the line from the spool 148. The subsequent discussion will explain the function of the ramp projections 142 and 145 and how they function in concert to force the spool 148 to rotate during the bumping action so that line can be released even if less than three inches of line is extending from the housing 111. The ramp projections 142 and 145 force the spool 148 to rotate in a direction opposite from the direction used for loading the trimmer line.

Figure 26:
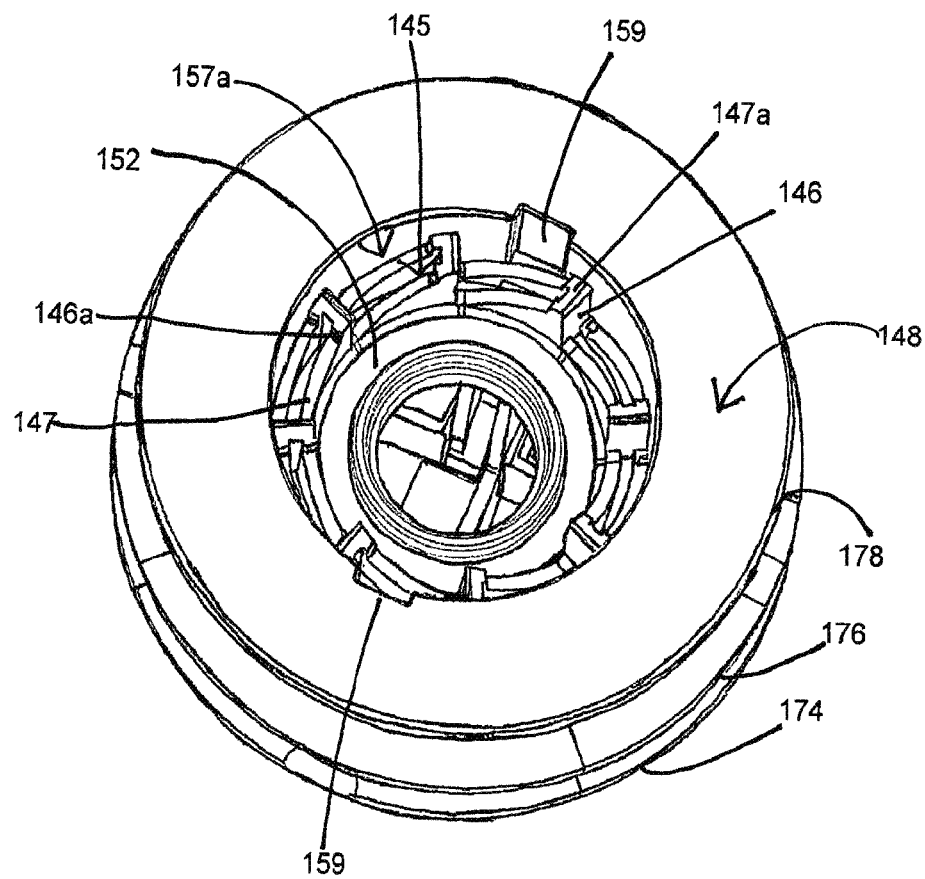
FIG. 26 is a perspective view of the spool of FIG. 25.

Referring to FIGS. 22 and 26 there are a plurality of the ramp projections 142 located on the main housing 112 and a plurality of the ramp projections 145 located on the main body 151 of the line channel cover 152. The ramp projections 142 are symmetrically disposed at the same height around the post 122. Each ramp projection 142 contains a first flat segment 143, a first vertical segment 143a, a second vertical segment 143b, and a sloped segment 144. When the line channel cover 152 is inserted within the center barrel of the spool 148, these two sets of ramp projections 145 and 142 function to force the indexing of the spool 148 when the bump knob 134 is bumped against the ground. These ramp projections 145 and 142 precisely control the indexing of additional line from the spool 148 and out of the trimmer head 110.

Even when the centrifugal force and air drag acting on the trimmer line cannot easily pull trimmer line from the trimmer head 110, the interaction of the ramp projections 145 and 142 will convert the energy from the bumping action to rotate the spool 148 in a CW direction (as depicted) regardless of the direction of rotation of the trimmer machine. Therefore, even if less than three inches of trimmer line is extending from the trimmer head 110, the trimmer line can still be indexed from the trimmer head 110 so long as the ends of the trimmer line are still extending through the eyelets 114 and 114a.

The design of the trimmer head 110 is unique for several reasons. First, other than selecting the correct fastener (thread direction), there are no parts to be configured by the user based upon the direction of rotation of the trimmer head 110. Second, the trimmer line can be indexed from the trimmer head 110 even if the user has worn down the line to lengths shorter than what would normally be needed for the centrifugal force and air drag to pull line from the trimmer head 110. The spool 148 can only rotate in a first direction when loading the trimmer line, and when the trimmer head 110 is bumped the spool 148 can rotate only in a second direction. The trimmer head 110 is an easy-load bump head with bump-activated forced discharge of the trimmer line.

As shown in FIG. 21, it will be appreciated that an optional spacer 188 can be used if the trimmer has a long stem. The use of these spacers is common. However, the trimmer head 110 is unique in that the line channels 172 and 172a allow room for use of this spacer 188. Additionally, the line channels 172 and 172a are unique in that the line passes down towards the bump knob 134 and then back up, passing through the axis of rotation.

It is thus evident that a trimmer head constructed as described herein substantially improves the art. Only particular embodiment(s) have been presented and described in detail, and the invention should not be limited by the drawings or the description provided. For an appreciation of the true scope and breadth of the invention, reference should be made only to the following claims.

What is claimed is:

1. A bump-activated trimmer head for utilizing wound trimmer line to cut vegetation, the trimmer head comprising:
    a housing configured to be attached to a rotary shaft of a rotary trimmer, the housing including a main housing and a lower cover, wherein a sidewall of the main housing contains at least a pair of opposed eyelets through which the trimmer line is discharged for cutting the vegetation;
    a spool encased within the housing and having a passageway for the trimmer line, the passageway having opposed ends that align with the opposed eyelets of the main housing and extending from one side of the spool to an opposite side of the spool;
    a bump knob mechanism operatively connected to the spool;
    a line channel cover inserted within a center barrel of the spool, wherein the line channel cover contains an internal line channel passageway that aligns with the passageway of the spool to allow for easy threading of the trimmer line; and
    two sets of a plurality of ramp projections, wherein a first set of the two sets of the plurality of ramp projections is located on an inside surface of an upper wall of the main housing and a second set of the two sets of the plurality of ramp projections is located on the line channel cover inserted within the center barrel of the spool, and wherein the two sets of ramp projections slide against each other to force the indexing of the spool when the bump knob mechanism is bumped against the ground thus forcing a length of the trimmer line from the trimmer head.

2. The bump-activated trimmer head of claim 1, wherein a shaft extension is insert molded into the main housing and the shaft extension interacts with the bump knob mechanism to control an axis of rotation of the bump knob mechanism.

3. The bump-activated trimmer head of claim 1, wherein at least one ramp projection of each set of the plurality of ramp projections includes a flat segment, a vertical segment, and a sloped segment.

4. The bump-activated trimmer head of claim 1, wherein at least one ramp projection of each set of the plurality of ramp projections includes a flat segment, a vertical segment, a first sloped segment, and a second sloped segment.

5. The bump activated trimmer head of claim 1, wherein at least one ramp projection of each set of the plurality of ramp projections includes a flat segment, a first vertical segment, a second vertical segment, and a sloped segment.

6. The bump activated trimmer head of claim 1, wherein at least one ramp projection of each set of the plurality of ramp projections includes a first vertical segment, a second vertical segment, a first sloped segment, and a second sloped segment.

7. The bump-activated trimmer head of claim 1, wherein the bump knob mechanism has an outer diameter equal to an outer diameter of the main housing.

8. The bump-activated trimmer head of claim 1, wherein the bump knob mechanism comprises both an indexing knob and a bump knob and wherein the bump knob has an outer diameter less than an outer diameter of the main housing.

9. The bump-activated trimmer head of claim 1, further comprising a third set of ramp projections located on a bottom surface of the spool and vertical walls and curvilinear slots located on a top surface of the lower cover and wherein the third set of ramp projections along with the vertical walls and curvilinear slots function together to control the direction of line released from the trimmer head and forcing the indexing of the spool when the bump knob mechanism is bumped against the ground.

10. The bump-activated trimmer head of claim 9, wherein at least one ramp projection of the third set of ramp projections includes a first flat segment, a vertical segment, and a sloped segment that combine to form a ramp shape of the ramp projections.

11. The bump-activated trimmer head of claim 1, wherein the main housing further comprises two openings in the sidewall on circumferentially opposite sides of the main housing, wherein the lower cover further comprises two tabs, and wherein the main housing and the lower cover are connected by the tabs extending upwardly into the interior of the main housing and being received by the openings.

12. The bump-activated trimmer head as claimed in claim 1, wherein the spool further comprises at least three flanges essentially parallel to each other, and wherein the opposed ends of the passageway are located between the same two flanges, and wherein the same two flanges are operationally connected by at least one inclining portion on a first of the two flanges and at least one opening on a second of the two flanges, thereby allowing passage of the trimmer line up the at least one inclining portion, through the at least one opening, and into a space defined by the second of the two flanges and the third flange.

13. The bump-activated trimmer head as claimed in claim 1, wherein the opposed ends of the passageway are located between a first flange and a middle flange, wherein the first flange includes two inclining portions positioned about 180 degrees opposite each other relative to the circumference of the first flange, and wherein the middle flange includes two openings in alignment and essentially contiguous with the two inclining portions of the first flange, such that the trimmer line, extending from each of the opposed eyelets of the main housing, is wound between the first and middle flange, up the inclining portions of the first flange, through the openings of the middle flange, and into a space between the middle flange and the third flange.

\* \* \* \* \*